US009288268B2

(12) United States Patent
Ramaswamy et al.

(10) Patent No.: US 9,288,268 B2
(45) Date of Patent: Mar. 15, 2016

(54) METHODS AND APPARATUS TO MONITOR SHOPPERS IN A RETAIL ENVIRONMENT

(75) Inventors: Arun Ramaswamy, Tampa, FL (US); Rafael E. Alonso, Tampa, FL (US); Fred A. Martensen, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 2187 days.

(21) Appl. No.: 12/164,819

(22) Filed: Jun. 30, 2008

(65) Prior Publication Data
US 2009/0326807 A1 Dec. 31, 2009

(51) Int. Cl.
*H04L 29/00* (2006.01)
*H04L 29/08* (2006.01)

(52) U.S. Cl.
CPC ..................... *H04L 67/12* (2013.01)

(58) Field of Classification Search
CPC ........................................ H04L 67/12
USPC .................. 701/207, 519; 340/988
See application file for complete search history.

(56) References Cited

U.S. PATENT DOCUMENTS

| 4,373,133 A | 2/1983 | Clyne et al. |
| 4,779,198 A | 10/1988 | Lurie |
| 4,799,243 A | 1/1989 | Zepke |
| 4,930,011 A | 5/1990 | Kiewit |
| 4,955,000 A | 9/1990 | Nastrom |
| 4,973,952 A | 11/1990 | Malec et al. |
| 4,990,892 A | 2/1991 | Guest et al. |
| 5,014,206 A | 5/1991 | Scribner et al. |
| 5,119,104 A | 6/1992 | Heller |
| 5,138,638 A | 8/1992 | Frey |
| 5,146,231 A | 9/1992 | Ghaem et al. |
| 5,287,266 A | 2/1994 | Malec et al. |
| 5,294,781 A | 3/1994 | Takahashi et al. |
| 5,321,396 A | 6/1994 | Lamming et al. |
| 5,387,993 A | 2/1995 | Heller et al. |
| 5,465,115 A | 11/1995 | Conrad et al. |
| 5,485,347 A | 1/1996 | Miura |
| 5,541,835 A | 7/1996 | Dextraze et al. |
| 5,559,496 A | 9/1996 | Dubats |

(Continued)

FOREIGN PATENT DOCUMENTS

| WO | 2004/086337 | 10/2004 |
| WO | 2006/052386 | 5/2006 |
| WO | 2006058274 A2 | 6/2006 |

OTHER PUBLICATIONS

International Searching Authority, "International Search Report", for counterpart PCT application Serial No. PCT/US2008/068786, mailed Jan. 16, 2009 (2 pages).

(Continued)

*Primary Examiner* — John Q Nguyen
*Assistant Examiner* — Michael Whalen
(74) *Attorney, Agent, or Firm* — Hanley, Flight & Zimmerman, LLC

(57) ABSTRACT

Methods and apparatus to monitor shoppers in a retail environment are disclosed herein. In a disclosed example method, a first signal is transmitted via a first device in a first direction to a second device and a second signal is transmitted via the first device in a second direction to a third device associated with a shopper. A direction of travel of the third device is determined based on the first signal and a path of travel of the third device through a monitored establishment is determined based on the second signal.

27 Claims, 9 Drawing Sheets

(56) References Cited

U.S. PATENT DOCUMENTS

| | | | |
|---|---|---|---|
| 5,583,776 A | 12/1996 | Levi et al. | |
| 5,633,946 A | 5/1997 | Lachinski et al. | |
| 5,640,002 A | 6/1997 | Ruppert et al. | |
| 5,640,144 A | 6/1997 | Russo et al. | |
| 5,692,215 A | 11/1997 | Kutzik et al. | |
| 5,712,830 A | 1/1998 | Ross et al. | |
| 5,764,283 A | 6/1998 | Pingali et al. | |
| 5,774,876 A | 6/1998 | Woolley et al. | |
| 5,815,114 A | 9/1998 | Speasl et al. | |
| 5,920,261 A | 7/1999 | Hughes et al. | |
| 5,969,755 A | 10/1999 | Courtney | |
| 5,973,732 A | 10/1999 | Guthrie | |
| 6,054,950 A | 4/2000 | Fontana | |
| 6,091,956 A | 7/2000 | Hollenberg | |
| 6,104,295 A | 8/2000 | Gaisser et al. | |
| 6,154,139 A | 11/2000 | Heller | |
| 6,211,790 B1 | 4/2001 | Radomsky et al. | |
| 6,252,522 B1 | 6/2001 | Hampton et al. | |
| 6,259,991 B1 | 7/2001 | Nysen | |
| 6,302,802 B1* | 10/2001 | Pao | 473/156 |
| 6,323,807 B1 | 11/2001 | Golding et al. | |
| 6,327,573 B1 | 12/2001 | Walker et al. | |
| 6,386,450 B1 | 5/2002 | Ogasawara | |
| 6,396,413 B2 | 5/2002 | Hines et al. | |
| 6,424,264 B1* | 7/2002 | Giraldin et al. | 340/573.1 |
| 6,430,498 B1 | 8/2002 | Maruyama et al. | |
| 6,433,689 B1 | 8/2002 | Hovind et al. | |
| 6,470,264 B2 | 10/2002 | Bide | |
| 6,493,649 B1 | 12/2002 | Jones et al. | |
| 6,563,423 B2 | 5/2003 | Smith | |
| 6,577,238 B1 | 6/2003 | Whitesmith et al. | |
| 6,614,721 B2 | 9/2003 | Bokhour | |
| 6,657,543 B1 | 12/2003 | Chung | |
| 6,697,104 B1 | 2/2004 | Yakobi et al. | |
| 6,697,628 B1 | 2/2004 | Green et al. | |
| 6,748,317 B2 | 6/2004 | Maruyama et al. | |
| 6,765,484 B2 | 7/2004 | Eagleson et al. | |
| 6,838,992 B2 | 1/2005 | Tenarvitz | |
| 6,898,434 B2 | 5/2005 | Pradhan et al. | |
| 6,911,908 B1 | 6/2005 | Beart | |
| 6,912,507 B1 | 6/2005 | Phillips et al. | |
| 6,919,803 B2 | 7/2005 | Breed | |
| 6,928,343 B2 | 8/2005 | Cato | |
| 6,940,403 B2 | 9/2005 | Kail, IV | |
| 6,951,305 B2 | 10/2005 | Overhultz et al. | |
| 6,970,131 B2 | 11/2005 | Percy et al. | |
| 6,992,582 B2 | 1/2006 | Hill et al. | |
| 7,006,982 B2 | 2/2006 | Sorensen | |
| 7,021,535 B2 | 4/2006 | Overhultz et al. | |
| 7,038,619 B2 | 5/2006 | Percy et al. | |
| 7,046,162 B2 | 5/2006 | Dunstant | |
| 7,069,238 B2 | 6/2006 | I'Anson et al. | |
| 7,076,441 B2 | 7/2006 | Hind et al. | |
| 7,080,061 B2 | 7/2006 | Kabala | |
| 7,099,676 B2 | 8/2006 | Law et al. | |
| 7,148,803 B2 | 12/2006 | Bandy et al. | |
| 7,183,910 B2 | 2/2007 | Alvarez et al. | |
| 7,229,023 B2 | 6/2007 | Raskar | |
| 7,295,108 B2 | 11/2007 | Corrado et al. | |
| 7,319,479 B1 | 1/2008 | Crabtree et al. | |
| 7,415,510 B1 | 8/2008 | Kramerich et al. | |
| 7,420,464 B2 | 9/2008 | Fitzgerald et al. | |
| 7,448,548 B1 | 11/2008 | Compton | |
| 7,460,827 B2 | 12/2008 | Schuster et al. | |
| 7,463,143 B2 | 12/2008 | Forr et al. | |
| 7,466,262 B2* | 12/2008 | Stephens | 342/146 |
| 7,471,987 B2 | 12/2008 | Crystal et al. | |
| 7,475,813 B2* | 1/2009 | Swanson, Sr. | 235/383 |
| 7,602,339 B2 | 10/2009 | Fullerton et al. | |
| 7,679,522 B2* | 3/2010 | Carpenter | 340/688 |
| 7,701,347 B2 | 4/2010 | Richards | |
| 7,739,705 B2 | 6/2010 | Lee et al. | |
| 7,843,379 B2 | 11/2010 | Menzer et al. | |
| 7,848,964 B2* | 12/2010 | Bonner et al. | 370/493 |
| 7,880,608 B2 | 2/2011 | Richards et al. | |
| 2002/0002504 A1 | 1/2002 | Engel et al. | |
| 2003/0055707 A1 | 3/2003 | Busche et al. | |
| 2003/0146871 A1 | 8/2003 | Karr et al. | |
| 2003/0171833 A1 | 9/2003 | Crystal et al. | |
| 2003/0222819 A1 | 12/2003 | Karr et al. | |
| 2003/0222820 A1 | 12/2003 | Karr et al. | |
| 2003/0227386 A1 | 12/2003 | Pulkkinen | |
| 2004/0027271 A1 | 2/2004 | Schuster et al. | |
| 2004/0039855 A1 | 2/2004 | Bohrer et al. | |
| 2004/0072577 A1 | 4/2004 | Myllymaki et al. | |
| 2004/0224703 A1 | 11/2004 | Takaki et al. | |
| 2005/0006466 A1 | 1/2005 | Overhultz et al. | |
| 2005/0035857 A1 | 2/2005 | Zhang et al. | |
| 2005/0141345 A1 | 6/2005 | Holm et al. | |
| 2005/0200476 A1 | 9/2005 | Forr et al. | |
| 2005/0201826 A1 | 9/2005 | Zhang et al. | |
| 2005/0203798 A1 | 9/2005 | Jensen et al. | |
| 2005/0234774 A1 | 10/2005 | Dupree | |
| 2005/0243784 A1 | 11/2005 | Fitzgerald et al. | |
| 2005/0246092 A1* | 11/2005 | Moscatiello | 701/207 |
| 2006/0053110 A1 | 3/2006 | McDonald et al. | |
| 2006/0065489 A1 | 3/2006 | Oh et al. | |
| 2006/0106674 A1 | 5/2006 | Muller | |
| 2006/0109125 A1 | 5/2006 | Overhultz et al. | |
| 2006/0111961 A1 | 5/2006 | McQuivey | |
| 2006/0136285 A1* | 6/2006 | Alvarez et al. | 705/10 |
| 2006/0186201 A1 | 8/2006 | Hart | |
| 2006/0200378 A1* | 9/2006 | Sorensen | 705/10 |
| 2007/0018811 A1 | 1/2007 | Gollu | |
| 2007/0225879 A1* | 9/2007 | French et al. | 701/23 |
| 2008/0008472 A1 | 1/2008 | Dress et al. | |
| 2008/0074264 A1 | 3/2008 | Sharpe et al. | |
| 2008/0077502 A1 | 3/2008 | Boyd | |
| 2008/0140479 A1 | 6/2008 | Mello et al. | |
| 2008/0147461 A1* | 6/2008 | Lee et al. | 705/7 |
| 2008/0294476 A1* | 11/2008 | Dupre et al. | 705/7 |
| 2008/0294487 A1* | 11/2008 | Nasser | 705/8 |
| 2009/0037575 A1 | 2/2009 | Crystal | |
| 2010/0199296 A1 | 8/2010 | Lee et al. | |

OTHER PUBLICATIONS

International Searching Authority, "Written Opinion", for counterpart PCT application Serial No. PCT/US2008/068786, mailed Jan. 16, 2009 (4 pages).

Sirohi, Niren et al., "A model of Consumer Perceptions and Store Loyalty Intentions for a Supermarket Retailer", Journal of Retailing, v74, n2, Summer, 1998 (15 pages).

Patent Cooperation Treaty, "International Preliminary Report on Patentability", for PCT application Serial No. PCT/US2008/068786, mailed Jan. 5, 2011 (5 pages).

Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).

Bernstein et al., "An Introduction to Map Matching for Personal Navigation Assistants," New Jersey TIDE Center, New Jersey Institute of Technology, Aug. 1996 (17 pages).

McCarthy et al., "RF Free Ultrasonic Positioning," Department of Computer Science, University of Bristol, U.K., 2003 (7 pages).

McCarthy et al., "RF Free Ultrasonic Positioning (Presentation)," 7th International Symposiom on Wearable Computers, Oct. 2003 (12 pages).

Gentile et al., "Robust Location using System Dynamics and Motion Constraints," National Institute of Standards and Technology, Wireless Communication Technologies Group, Jun. 24, 2004 (5 pages).

Cricket Project, "Cricket v2 User Manual," MIT Computer Science and Artificial Intelligence Lab, Cambridge, U.S.A., Jan. 2005 (57 pages).

Holm, Sverre, "Technology Presentation," [online]. Sonitor Technologies, May 26, 2004 [retrieved on Oct. 13, 2004]. Retrieved from the Internet: <URL: www.sonitor.com/news/article.asp?id=62> (16 pages).

"The Nibble Location System," [online]. UCLA, May 21, 2001 [retrieved on Nov. 2, 2004]. Retrieved from the Internet: <URL: http://mmsl.cs.ucla.edu/nibble/>. (13 pages).

(56) References Cited

OTHER PUBLICATIONS

"New Sonitor Patent Combines Ultrasound and RFID," [online]. Sonitor Technologies, Feb. 17, 2005 [retrieved on Jun. 13, 2005]. Retrieved from the Internet: <URL: http://sonitor.com/news/article.asp?id=73>. (1 page).

"NIST Location System," [online]. Wireless Communication Technologies Group, National Institute of Standards and Technology, Mar. 12, 2004 [retrieved in Nov. 1, 2004]. Retrieved from the Internet: <URL: www.antd.nist.gov>. (2 pages).

Ferguson, Michael. "XTension Tech Notes," [online]. Sand Hill Engineering Inc., Dec. 10, 1998 [retrieved in Jan. 12, 2004]. Retrieved from the Internet: <URL: http://www.shed.com/articles/TN.proximity.html >. (9 pages).

"FM Wireless Microphone Module Kits," [online]. Horizon Industries, 2004 [retrieved on Sep. 30, 2004]. Retrieved from the Internet: <URL: www.horizonindustries.com/fm.htm>. (1 page).

"Arkon Sound Feeder II FM Transmitter," [online]. Yahoo Shopping, 2002 [retrieved on Sep. 29, 2004]. Retrieved from the Internet: <URL: http://store.yahoo.com/semsons-inc/arsoundfeedii.html>. (2 pages).

"Dust Networks—SmartMesh," [online]. Dust Networks Inc., 2002 [retrieved on Sep. 29, 2004]. Retrieved from the Internet: <URL: www.dustnetworks.com>. (2 pages).

Kanellos, Michael. "Dust Makes Mesh of Wireless Sensors," [online]. CNET News.com, Sep. 20, 2004 [retrieved on Sep. 29, 2004]. Retrieved from the Internet: <URL: http://www.news.com/Dust-makes-mesh-of-wireless-sensors/2100-1008_3-5374971.html ?tag=item>. (2 pages).

"UHF Radio Data Logging System—Genii Data Logger," [online]. Amplicon, 2004 [retrieved on Sep. 29, 2004]. Retrieved from the Internet: <URL: www.amplicon.co.uk/drprod3.cfm/subsecid/10037/secid/l/groupid/1 1809.htm>. (3 pages).

"Eltek Genii Radio Data Logging System," [online]. Eltek Ltd., 2004 [retrieved on Sep. 29, 2004]. Retrieved from the Internet: <URL: www.elteckdataloggers.co.uk>. (4 pages).

"Discovery Spy Motion Tracking System," [online]. Discovery Communications Inc., 2004 [retrieved on Sep. 14, 2004]. Retrieved from the Internet: <URL: http:// shopping.discovery. com/stores/servlet/ProductDisplay?catalogid=1OOOO&storeid=1OOOO&lanlan=-l&productId=53867&partnumber=689638>. (3 pages).

Schuman, Evan. "Smarter Smart Cart?" [online]. Storefront Backtalk, Feb. 16, 2005 [retrieved on Nov. 20, 2006]. Retrieved from the Internet: <URL: www.storefrontbacktalk.com>. (5 pages).

"University Library Navigation Enabled by Ekahau," [online]. Directions Magazine, Jun. 12, 2003 [Aug. 3, 2007]. Retrieved from the Internet: <URL: http://www/directionsmag.com/press.releases/index.php?duty=Show&id=7276&trv=l>. (3 pages).

Yeung, K.L., & Yum, T.-S.P. "A Comparative Study on Location Tracking Strategies in Cellular Mobile Radio Systems," Global Telecommunications Conference, 1995. Globecom '95, IEEE, Nov. 14-26, 1995 (pp. 22-28 vol. 1).

Handy et al., "Lessons Learned from Developing a Bluetooth Multiplayer-Game," 2nd International Conference on Pervasive Computing, Workshop on Gaming, [retrieved from internet, http://www.ipsi.fraunhofer.de/ambiente/pervasivegaming/papers/Handy_Pervasive2004.pdf ] (pp. 7).

Battiti, Roberto, et al. "Location-Aware Computing: a Neutral Network Model for Determining Location in Wireless LANS" University of Trento: Department of Information and Communication Technology, Technical Report #DIT-02-0083, Feb. 2002 (pp. 1-16).

Azondekon et al., "Service Selection in Networks Based on Proximity Confirmation Using Infrared", http://www.scs.carleton.ca/~barbeau/Publications/2002/azondekon.pdf, International Conference on Telecommunications (ICT) Beijing, 2002 (5 Pages).

Bahl et al., "A Software System for Locating Mobile Users: Design, Evaluation, and Lessons", Technical Report MSRTR-2000-12 Microsoft Research, [retrieved from internet, http://research.microsoft.com/~bahl/Papers/Pdf/radar.pdf], Feb. 2000 (13 Pages).

"Out of the Lab and into the Field: A Report on the Extended Field Test of Arbitron's Portable People Meter in Manchester, England, "XP-002978594, Arbitron, 2000, 23 Pages.

"Ekahau Site Survey—Ekahau: Features," [online]. Ekahau, Inc., [retrieved on Mar. 12, 2004]. Retrieved from the Internet: <URL: http://www.ekahau.com/products/sitesurvey/ess20_features.html>. (3 pages).

"Ekahau Positioning Engine 2.1—Ekahau," [online]. Ekahau, Inc., [retrieved on Mar. 12, 2004]. Retrieved from the Internet: <URL: http://www.ekahau.com/products/positioningengine/>. (3 pages).

"Ekahau Positioning Engine 2.1 specifications—Ekahau," [online]. Ekahau, Inc., [retrieved on Mar. 12, 2004]. Retrieved from the Internet: <URL: http://www.ekahau.com/products/positioningengine/epe20_specifications.html>. (2 pages).

"Ekahau Positioning Engine 2.1 requirements—Ekahau," [online]. Ekahau, Inc., [retrieved on Mar. 12, 2004]. Retrieved from the Internet: <URL: http://www.ekahau.com/products/positioningengine/epe20_requirements.html>. (2 pages).

"Ekahau Positioning Engine 2.1 Case Studies—Ekahau," [online]. Ekahau, Inc., [retrieved on Mar. 12, 2004]. Retrieved from the Internet: <URL: http://www.ekahau.com/products/positioningengine/epe20_casestudies.html>. (2 pages).

"Ekahau Site Survey—Ekahau: Site Survey™ 2.0," [online]. Ekahau, Inc., [retrieved on Mar. 12, 2004]. Retrieved from the Internet: <URL: http://www.ekahau.com/products/sitesurvey/>. (3 pages).

"Ekahau Site Survey—Ekahau: Quick-FAQ," [online]. Ekahau, Inc., [retrieved on Mar. 12, 2004]. Retrieved from the Internet: <URL: http://www.ekahau.com/products/sitesurvey/ess20_faq.html>. (4 pages).

"Ekahau Positioning Engine 2.1 Features—Ekahau: Positioning in 802.11 b Networks," [online]. Ekahau, Inc., [retrieved on Mar. 12 ,2004]. Retrieved from the Internet: <URL: http://www.ekahau.com/products/positioningengine/epe20_features.html>. (2 pages).

"Ekahau Positioning Engine 2.1 Data Sheet". Ekahau, Inc., Nov. 24, 2003 (2 pages).

"DRM-III OEM Circuit Module," [online]. Point Research Corporation, Apr. 1, 2004, [retrieved on Jul. 2, 2010]. Retrieved from the Internet: <URL: http://web.archive.org/web/20040401214 737/http://pointresearch.com/drm3module.htm>. (3 pages).

Gaynor et al., "RF Tracking," Boston University (7 pages).

Trolley Scan (PTY) LTD, "Trolleyponder®/ EcoTag®: Small and medium Production Systems", http://trolley.co.za/isosys.html (5 Pages).

RFID Journal, "New Energy-Efficient RFID Tag", http://www.rfidjournal.com/article/articleprint/718/-1/1, 2002 (2 Pages).

Clark, Julie. "Shopping with Detectives: Customer Tracking Takes the Mystery out of Store Design (The Digital Store)," Display and Design Ideas, May 2002 (v14, n5, p48, 2 pages).

Ultrasound Detector D 100, User Manuel, 2 pages.

Goliath Solutions How it Works, retrieved from http://www/goliathsolutions.com/html/how_it_works/how_it_works.htm, on or before Jul. 14, 2006, 3 pages.

Bahl et al., "Enhancements to the RADAR User Location and Tracking System," Technical Report MSRTR-2000-12: Microsoft Research, http://research.microsoft.com/~padmanab/papers/msr-tr-2000-1 2.pdf, Feb. 2000 (13 Pages).

Falk et al.," Pirates: Proximity-Triggered Interaction in a Multi-Player Game,". http://www.playresearch.com/, 2001 (2 Pages).

Rekimoto et al., "CyberCode: Designing Augmented Reality Environments with Visual Tags," http://www. csl.sony.co.jp/person/rekimoto/papers/dare2000.pdf, 2000 ( 10 Pages).

Wilson et al, "The Narrator: A daily Activity Summarizer using Simple Sensors in an Instrumented Environment," www.cs.cmu.edu/~dwilson/papers/wilsonUBICOMP2003DEMO.pdf, 2003 (4 Pages).

Shen et al., "RemoteEyes: A Remote Low-Cost position Sensing Infrastructure for Ubiquitous Computing," http://hct.ece.ubc.ca/publications/pdf/shen-etal-inss2004.pdf, 2004 (5 Pages).

TRAF-SYS People Counting Systems, "Thermal Sensor Installation (wireless)," revised Dec. 15, 2008, retrieved from http://www.trafsys.com/media/6980/thermal_sensor(wireless )_installation.pdf, 24 pages.

\* cited by examiner

AREA IDENTIFIER TRANSMISSION SEQUENCE (TOP VIEW)

METHODS AND APPARATUS TO MONITOR SHOPPERS IN A RETAIL ENVIRONMENT

FIELD OF THE DISCLOSURE

The present disclosure relates generally to consumer monitoring and, more particularly, to methods and apparatus to monitor shoppers in a retail environment.

BACKGROUND

Retail establishments and product manufacturers are often interested in the shopping activities, behaviors, and/or habits of people in a retail environment. Consumer activity related to shopping can be used to correlate product sales with particular shopping behaviors and/or to improve placements of products, advertisements, and/or other product-related information in a retail environment. Known techniques for monitoring consumer activities in retail establishments include conducting surveys, counting patrons, and/or conducting visual inspections of shoppers or patrons in the retail establishments.

Acquiring information related to shopping activities, behaviors, and/or habits of people in a retail environment enables retail establishments to arrange their store and product layouts in a manner that is most conducive to maximizing sales of such products by positively influencing shoppers. Acquiring such information also enables product manufacturers to design product packaging that influences shoppers exhibiting certain behaviors or shopping patterns and/or to design different product packaging to target different shopper behaviors, patterns, or habits associated with different geographic areas. Advertisers can also benefit from metering shopping activities, behaviors, and/or habits of people in a retail environment by using such information to create more effective advertisements and/or position advertisements in more opportune locations within different retail establishments. In addition, advertisers can assess which advertisements are more effective than others.

DETAILED DESCRIPTION

Figure 1:
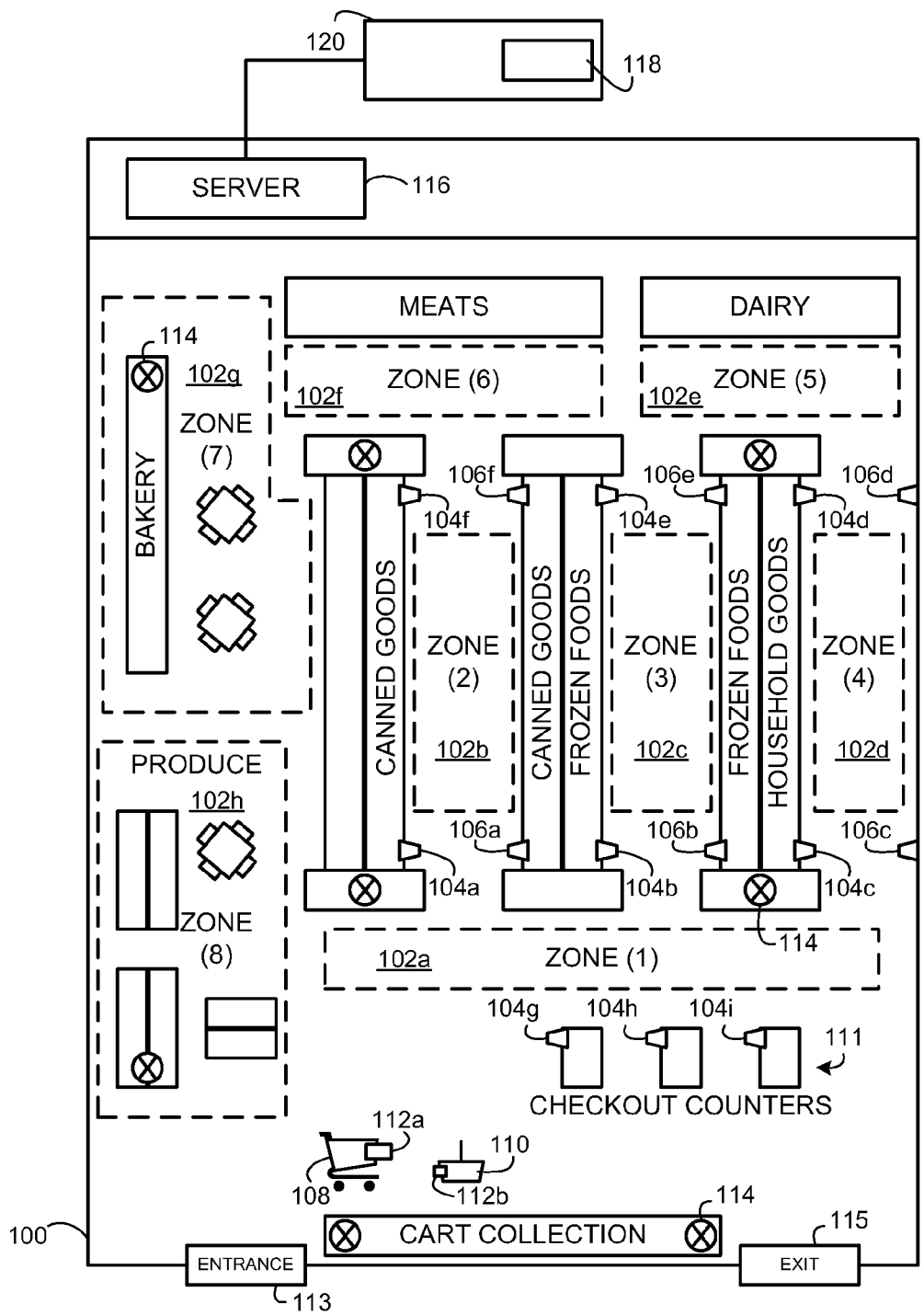
FIG. 1 illustrates a plan view of an example retail establishment.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, or in any combination of hardware and software. Accordingly, while the following describes example methods, systems, and apparatus, persons having ordinary skill in the art will readily appreciate that the examples provided are not the only way to implement such methods, systems, and apparatus.

The example methods and apparatus described herein may be implemented by a consumer metering entity, by a retail business, or by any other entity interested in collecting and/or analyzing information to monitor persons in a monitored environment. For example, the example methods and apparatus may be used to monitor shopper traffic and quantities of shoppers in a retail establishment. The example methods and apparatus can be used to determine shopper locations associated with shopper traffic and the times at which locations of those shoppers are detected. In addition, paths of travel of different shoppers can be determined. The example methods and apparatus may be used to help marketing and media professionals better understand the amount of shopper traffic and shopper traffic trends in retail establishments. Such information may be used to determine how to reach and influence shoppers that buy goods in retail establishments. For example, by monitoring in-store shopper quantities and traffic, the example methods and apparatus described herein can be used to determine when shopper traffic is heaviest and lightest and to determine locations most frequented in a retail establishment.

In the illustrated examples described below, each location in a monitored environment (e.g., a retail establishment) at which traffic is to be monitored is provided with a stationary transmitter module and a stationary receiver module located some distance away from the stationary transmitter module sufficient to allow a person and a shopping cart to move between the transmitter and receiver modules. The stationary transmitter module transmits two separate signals (e.g., infrared signals). In particular, the stationary transmitter module transmits a first one of the signals toward the stationary receiver module in a substantially continuous fashion. The stationary receiver module is provided with two horizontally spaced sensors used to detect reception of the first signal and to detect when the first signal is obstructed by a passing person or shopping cart. The sensors are horizontally spaced to detect the direction of travel of a person as described below. When a person or shopping cart traverses the first signal, the resulting temporary blocking of the signal causes the stationary receiver module to generate an event indicating that something (e.g., a person or a shopping cart) has been detected as traversing the first signal. The stationary receiver module then records a direction of travel for that person and increments a count value corresponding to that person and the detected direction of travel. The quantity of people in a shopping aisle at any one time can be determined using two stationary transmitter/receiver module pairs at both ends of the aisle and keeping separate entering count and exiting count values for each of the transmitter/receiver module pairs.

To monitor paths of travel of shoppers through a retail establishment, each shopping cart and/or shopping basket of a retail establishment is provided with a mobile tag having signal receiving capabilities. The second signal transmitted by the stationary transmitter module is transmitted at a suitable angle relative to the first infrared signal toward a location at which mobile tags coupled to shopping carts or shopping baskets can detect the second signal. The second signal is encoded with a location identification code indicative of a location (e.g., a shopping aisle) proximate the stationary transmitter module or in which the stationary transmitter module is placed. In this manner, when a person moves a cart or basket proximate to or adjacent the stationary transmitter module, the mobile tag detects the second signal and stores the location identification code transmitted via the second signal. In this manner, the mobile tag stores all of the location identification codes collected during a shopping trip and the codes can subsequently be analyzed to determine a path of travel of the person. Further structural features, operations, configurations, and aspects of the example methods and apparatus are described below in connection with the illustrated figures.

FIG. 1 illustrates a plan view of an example retail establishment 100 having a plurality of zones 102a-h. In the illustrated example, the retail establishment 100 is a grocery store. However, the example methods and apparatus described herein can be used to monitor traffic in other types of retail establishments (e.g., department stores, clothing stores, specialty stores, hardware stores, etc.) or commercial establishments (e.g., entertainment venues, amusement parks, sports arenas/stadiums, etc.). The zones 102a-h are assigned sequential numerical values and include a first zone (1) 102a, a second zone (2) 102b, a third zone (3) 102c, a fourth zone (4) 102d, a fifth zone (5) 102e, a sixth zone (6) 102f, a seventh zone (7) 102g, and an eighth zone (8) 102h. A zone is an area of a monitored environment accessible by people who are to be monitored to generate traffic counts and paths of travel of those people. In the illustrated example, the boundaries of a zone may relate to product layout throughout the retail establishment, furniture layout, and/or other boundary-creating features (e.g., an outdoor garden and lawn area). In some example implementations, zones are created based on the types of products that are sold in particular areas of a retail establishment. In the illustrated example, the first zone (1) 102a corresponds to a checkout line category, the second zone (2) 102b corresponds to a canned goods category, the third zone (3) 102c corresponds to a frozen foods category, the fourth zone (4) 102d corresponds to a household goods category, the fifth zone (5) 102e corresponds to a dairy category, the sixth zone (6) 102f corresponds to a meats category, the seventh zone (7) 102g corresponds to a bakery category, and the eighth zone (8) 102h corresponds to a produce category. A department store may have other types of zones in addition to or instead of the category zones 102a-h of FIG. 1 that may include, for example, a women's clothing zone, a men's clothing zone, a children's clothing zone, a household appliance zone, an automotive hardware zone, a seasonal items zone, a pharmacy zone, etc.

In the illustrated example, the retail establishment 100 is provided with stationary transmitter modules 104a-i and stationary receiver modules 106a-f to monitor shopper quantities and paths traveled by shoppers through the retail establishment 100. In the illustrated example, a shopping cart 108 and a shopping basket 110 are each provided with a respective mobile tag 112a and 112b (i.e., a mobile receiver module). The mobile tags 112a-b are configured to work in cooperation with the stationary transmitter modules 104a-i to track the movements of shoppers or paths traveled by shoppers throughout the retail establishment 100. In the illustrated example, the stationary transmitter modules 104g-i are located at check counters 111. Codes transmitted by the stationary transmitter modules 104g-i are indicative of their respective checkout counters 111 and are used to indicate that a person has ended a shopping trip as discussed below in connection with FIG. 11. Although not shown, stationary transmitter modules substantially similar to the stationary transmitter modules 104a-i can also be located in areas of the retail establishment 100 where it is not needed (or not possible) to collect shopper quantities or shopper counts but where cart and basket path of travel tracking is still desired such as, for example, in open areas. In addition, although not shown, stationary transmitter modules substantially similar to the stationary transmitter modules 104a-i and stationary receiver modules substantially similar to the stationary receiver modules 106a-f can also be located at entrance doors 113 and exit doors 115 of the retail establishment 100 for counting people entering and leaving the retail establishment 100.

In the illustrated example, all of the stationary transmitter modules 104a-i are substantially similar or identical, all of the stationary receiver modules 106a-f are substantially similar or identical, and all of the mobile tags 112a-b are substantially similar or identical. The stationary transmitter modules 104a-i, the stationary receiver modules 106a-f, and the mobile tags 112a-b are discussed in greater detail below in connection with FIGS. 2-8.

The retail establishment 100 is also provided with a plurality of wireless communication repeaters 114 that are wirelessly communicatively coupled to the stationary receiver modules 106a-f, the mobile tags 112a-b, and a local in-store server 116 located in or proximate to the retail establishment 100. The stationary receiver modules 106a-f and the mobile tags 112a-b wirelessly communicate collected information (e.g., shopper counts, travel direction information, location identification or zone identifier information, etc.) to the in-store server 116 directly or via the wireless communication repeaters 114. In the illustrated example, the quantity of repeaters 114 located throughout the retail establishment 100 is selected to ensure sufficient wireless communication coverage throughout the establishment 100 so that the stationary receiver modules 106a-f and the mobile tags 112a-b can communicate information from different locations.

In the illustrated example, the in-store server 116 is communicatively coupled to a server 118 in a central facility 120 via a telephone line, a broadband internet connection, a wireless cellular connection, and/or any other suitable communication interface. In this manner, the in-store server 116 can communicate information received from the stationary receiver modules 106a-f and the mobile tags 112a-b to the server 118 for subsequent analyses. In this manner, the in-store server 116 and/or the server 118 can analyze person counts, directions of travel, and paths of travel.

Figure 2:
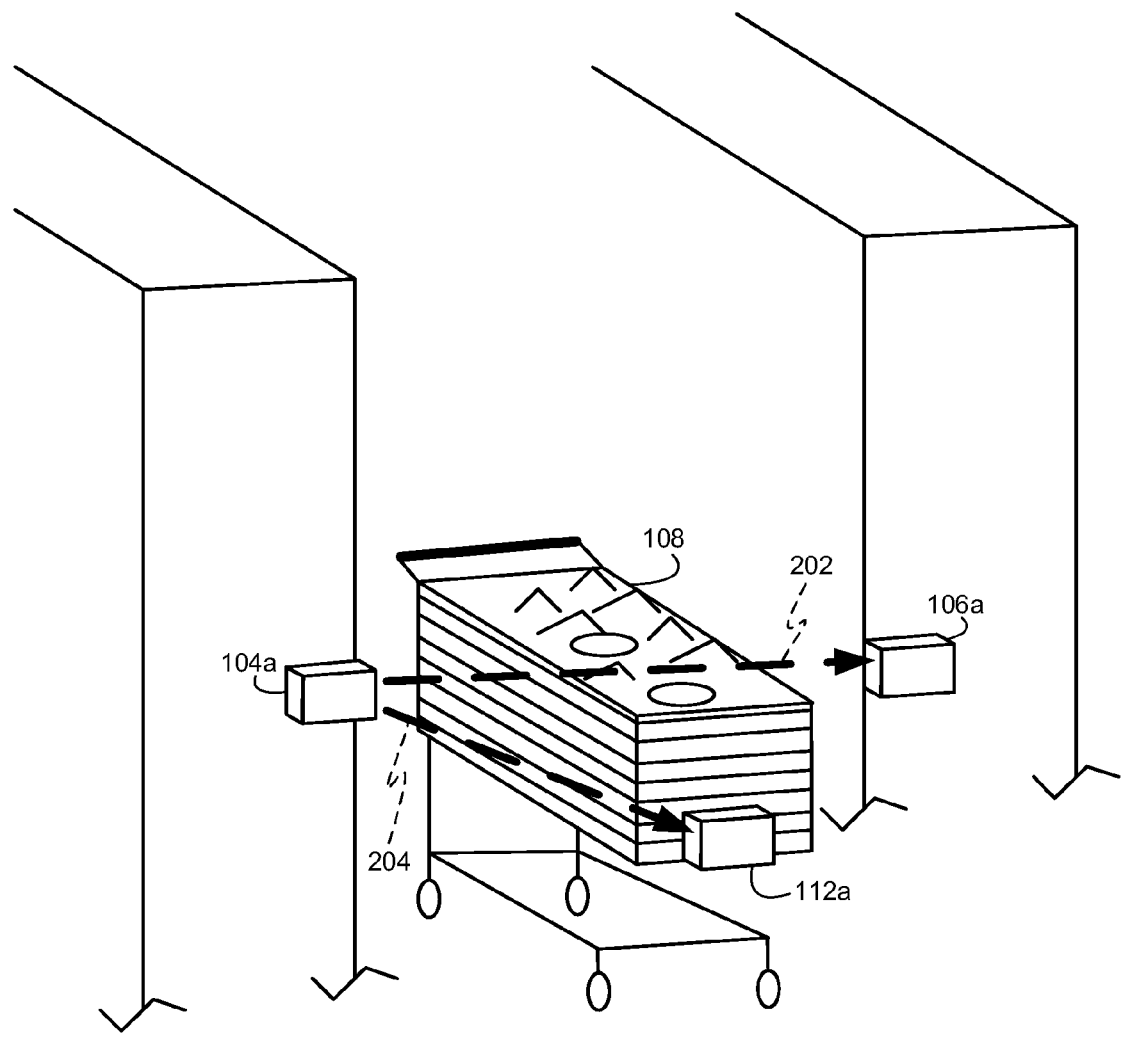
FIG. 2 depicts an isometric view of an example arrangement of receiver and transmitter modules in an aisle of the retail establishment of FIG. 1.

FIG. 2 depicts an isometric view of an example arrangement of the stationary transmitter module 104a, the stationary receiver module 106a, and the mobile tag 112a in an aisle of the retail establishment 100 of FIG. 1. In the illustrated example, the stationary transmitter module 104a and the stationary receiver module 106a are located on opposing sides of a shopping aisle and are mounted to shelf units so that a person detection signal 202 emitted by the stationary transmitter module 104a is detected by the stationary receiver module 106a. In the illustrated example, when the cart 108 or a person pushing the cart 108 obscures or blocks the signal 202, thus interrupting reception of the signal 202 by the stationary receiver module 106a, the stationary receiver module 106a determines and stores the direction of travel of the person or cart 108 and increments a person count value associated with that direction of travel. In the illustrated example, the detected directions of travel are denoted as either an entering direction (i.e., a direction that indicates a person is entering a corresponding zone (e.g., the zone (2) 102b of FIG. 1)) or an exiting direction (i.e., a direction that indicates a person is exiting from a corresponding zone).

Each of the stationary receiver modules 106a-f stores entries including directions of travel information indicative of times at which people were detected as entering or exiting respective areas (e.g., respective ones of the zones 102a-h). In addition, each of the stationary receiver modules 106a-f stores two count values, one of which is an entering count value and the other an exiting count value. The entering count value is indicative of all the people that have been detected as entering a respective zone, and the exiting count value is indicative of all the people that have been detected as exiting a respective zone. At any given time, the count values can be used to determine how many people are in a particular zone at that time. For example, referring to zone (2) 102b of FIG. 1, entering and exiting count values (e.g., the entering count value 1008 and the exiting count value 1010 of FIG. 10) stored in the stationary receiver modules 106a and 106f located at opposing entry/exit ways of the zone (2) 102b can be used to determine how many people are present in the zone (2) 102b by adding the entering count value from the module 106a to the entering count value from the module 106f to determine a total entering count value, adding the exiting count value from the module 106a to the exiting count value from the module 106f to determine a total exit count value, and subtracting the total exit count value from the total entering count value.

As shown in FIG. 2, the stationary transmitter module 104a transmits a second, location identification signal 204, which is used to identify the area (e.g., the zone (2) 102b) corresponding to the stationary transmitter module 104a. In the illustrated example, the stationary transmitter module 104a transmits the second signal 204 at an angle relative to the person detection signal 202 so that it travels or projects toward a location at which it can be detected by the mobile tag 112a. The mobile tag 112a is mounted on the cart 108 such that it is in a position relatively lower than the position of the stationary receiver module 106a. In this manner, the location identification signal 204 will not interfere with the reception of the person detection signal 202 at the stationary receiver module 106a and the person detection signal 202 will not interfere with the reception of the location identification signal 204 at the mobile tag 112a.

In the illustrated example, the person detection signal 202 and the location identification signal 204 are implemented using infrared light sources. In other example implementations, other suitable types of signals may be used instead including, for example, near-infrared signals or visible light signals.

Figure 3:
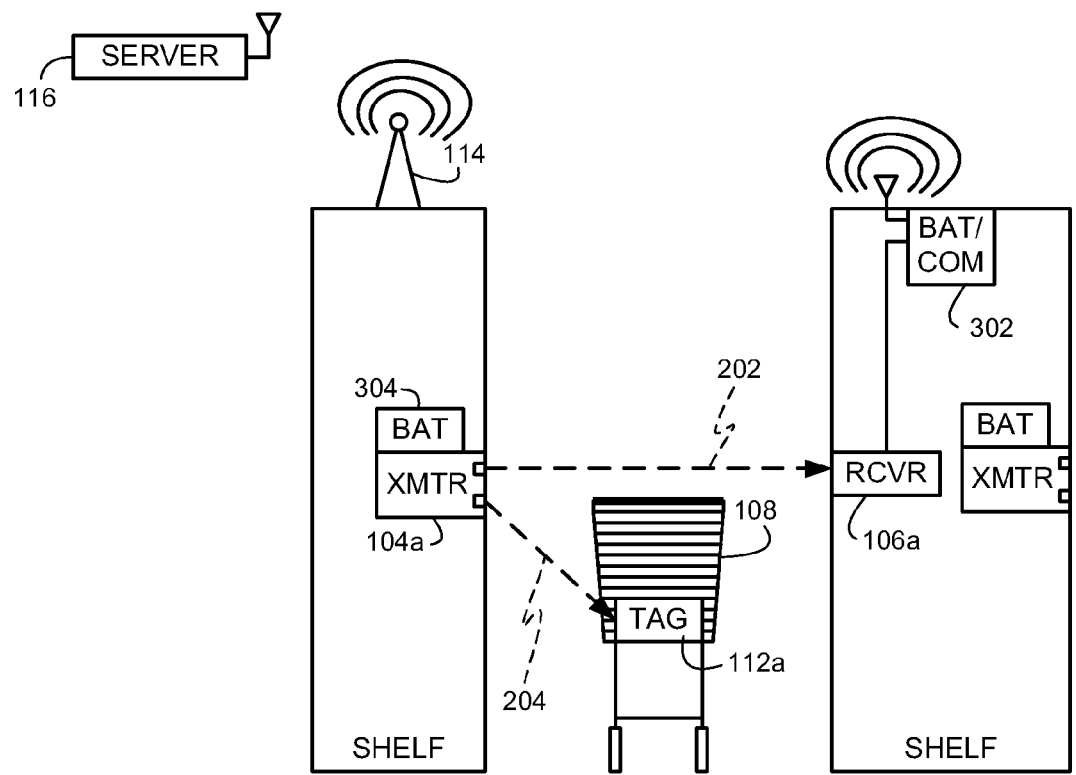
FIG. 3 depicts an elevation view of the example module arrangement of FIG. 2.

FIG. 3 depicts an elevation view of the example module arrangement of FIG. 2. In the illustrated example, the stationary receiver module 106a is shown as being coupled to a battery/communication module 302. The battery/communication module 302 provides battery power to the stationary receiver module 106a and an interface for wirelessly communicating person count values and detected direction of travel information to the server 116. In the illustrated example, the battery/communication module 302 wirelessly transmits information from the stationary receiver module 106a directly to the server 116 or indirectly to the server 116 via one or more of the wireless communication repeaters 114 if the battery/communication module 302 is out of wireless transmission range from the server 116.

As shown, the stationary transmitter module 104a is coupled to a battery module 304 to receive electrical power to perform its operations. In the illustrated example, the stationary transmitter and receiver modules 104a and 106a are powered via batteries to avoid having to run electrical power lines through a monitored establishment where none are otherwise readily available. In some example implementations in which electrical power lines are readily available, the stationary transmitter and receiver modules 104a and 106a can alternatively be configured to be powered using the electrical power (e.g., alternating current, direct current, etc.).

Figure 4:
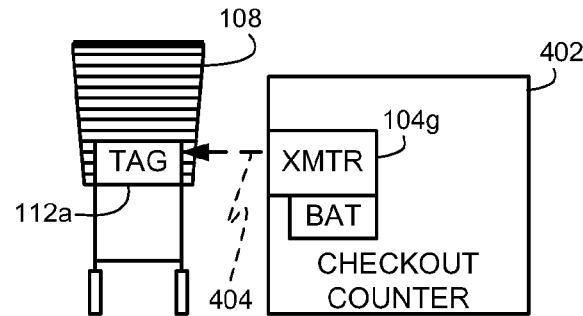
FIG. 4 depicts an elevation view of another module arrangement at a checkout counter of the example retail establishment of FIG. 1.

FIG. 4 depicts an elevation view of another module arrangement at a checkout counter 402 of the example retail establishment 100 of FIG. 1. In the illustrated example, the stationary transmitter module 104g is mounted on the checkout counter 402 at a position to ensure that a location identification infrared signal 404 transmitted by it will be detected by the mobile tag 112a. In the illustrated example, a location identification code transmitted by the stationary transmitter module 104g via the signal 404 indicates that the shopping cart 108 is at the checkout counter 402 and, thus, a shopping trip of a person associated with the cart 108 has ended.

Figure 5:
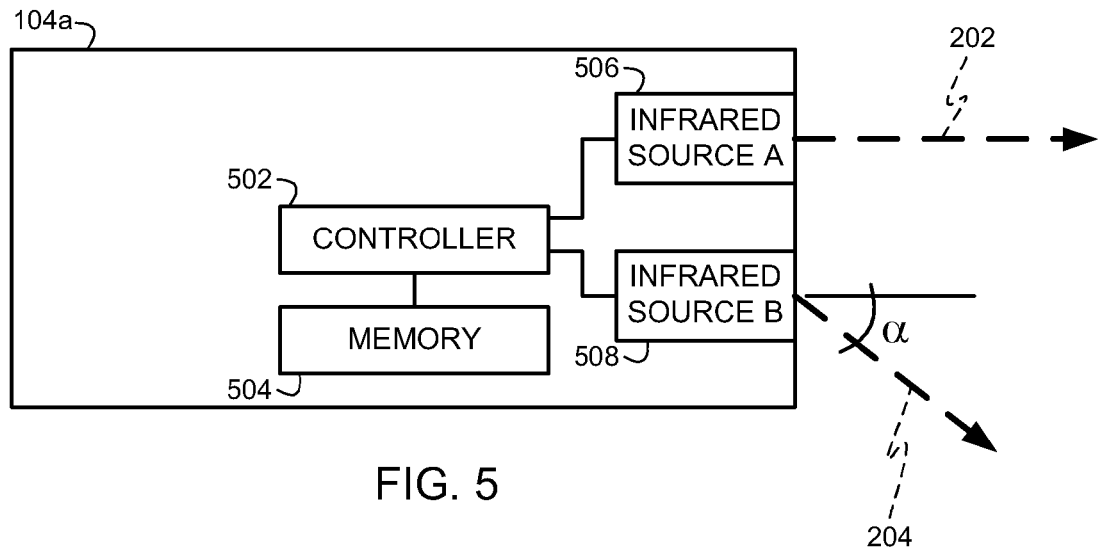
FIG. 5 is a block diagram of an example stationary transmitter module of FIGS. 1-3.

FIG. 5 is a block diagram of the example stationary transmitter module 104a of FIGS. 1-3. As shown, the example stationary transmitter module 104a includes a controller 502 and a memory 504 coupled to the controller 502. The memory 504 is configured to store machine readable and executable instructions that, when executed by the controller 502, cause the controller 502 to transmit the signals 202 and 204. To transmit the person detection signal 202, the stationary transmitter module 104a is provided with an infrared source A 506, and to transmit the location identification signal 204, the stationary transmitter module 104a is provided with another infrared source B 508. The infrared sources 506 and 508 can be implemented using infrared light emitting diodes (LED's). As shown, the infrared source B 508 is configured to transmit or emit the location identification signal 204 away from the stationary transmitter module 104a at an angle ($\alpha$) relative to the direction of propagation of the person detection signal 202. In this manner, detection of the respective signals 202 and 204 by the stationary receiver module 106a and the mobile tag 112a (FIGS. 1-3) do not interfere with one another. In the illustrated example, the angle ($\alpha$) of the location identification signal 204 relative to the direction of propagation of the person detection signal 202 is about forty-five degrees (45°). In other example implementations, the angle ($\alpha$) may be any other suitable angle between, for example, zero degrees (0°) and ninety degrees (90°) to enable the mobile tag 112a to detect the location identification signal 204.

Figure 6:
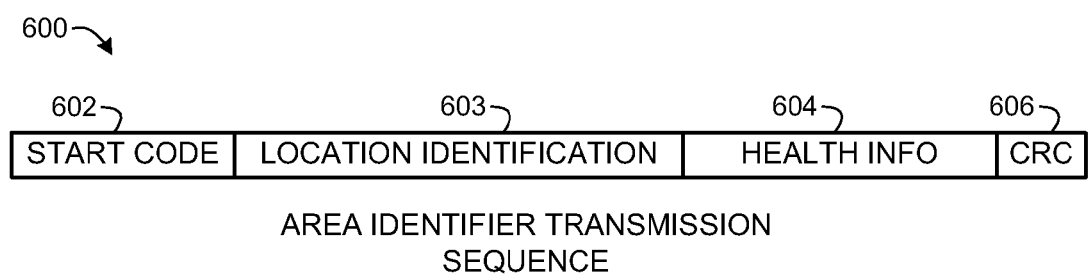
FIG. 6 depicts data transmitted by the example stationary transmitter module of FIGS. 1-3 and 5 via a location identification signal.

FIG. 6 depicts example data 600 transmitted by the example stationary transmitter module 104a via the location identification signal 204. In the illustrated example, the controller 502 of FIG. 5 is configured to encode the data 600 into the location identification signal 204. As shown, the example data 600 includes a start code 602, health information 604, a location identification code 603, and a cyclic redundancy check (CRC) value 606. The start code 602 denotes the start of a transmission and is used to provide the mobile tag 112a with infrared noise immunity from ambient infrared signals generated by light sources, the Sun, or any other sources of infrared noise. That is, in the illustrated example, the mobile tag 112a is configured to ignore detected infrared signals that do not transmit the start code 602. Thus, if the mobile tag 112a detects infrared light from the Sun or another source, it will not attempt to decode and/or store an invalid location identification code based on that detected infrared light. The health information 604 includes status information corresponding to the stationary transmitter module 104a including, for example, the remaining battery power or battery life of the battery 304 of FIG. 3. The location identification code 603 is a value unique to the stationary transmitter module 104a and is indicative of the area (e.g., the zone (2) 102b of FIG. 1) corresponding to the stationary transmitter module 104a. The CRC value 606 is representative of the start code 602, the location identification code 603, and the health information 604 transmitted by the stationary transmitter module 104a and is used by the mobile tag 112a to confirm the integrity of the received codes 602, 603, and 604.

The controller 502 can periodically or aperiodically determine the health information 604 (e.g., remaining battery power or battery life of the battery 304 of FIG. 3) and store the health information 604 in the memory 504 (FIG. 5). In addition, the start code 602 and the location identification code 603 are stored in the memory 504 of the example stationary transmitter module 104a, and the CRC value 606 is determined by the controller 502 when it causes the infrared source B 508 to transmit the data 600.

In the illustrated example, the memory 504 can also store instructions to cause the controller 502 to control transmissions of the signals 202 and 204 based on certain timing parameters or transmission pattern parameters. For example, to transmit the data 600 with sufficient frequency to ensure detection by any mobile tag 112a that is moved between the stationary transmitter and receiver modules 104a and 106a, the controller 502 can transmit the data 600 at suitable time intervals.

Figure 7:
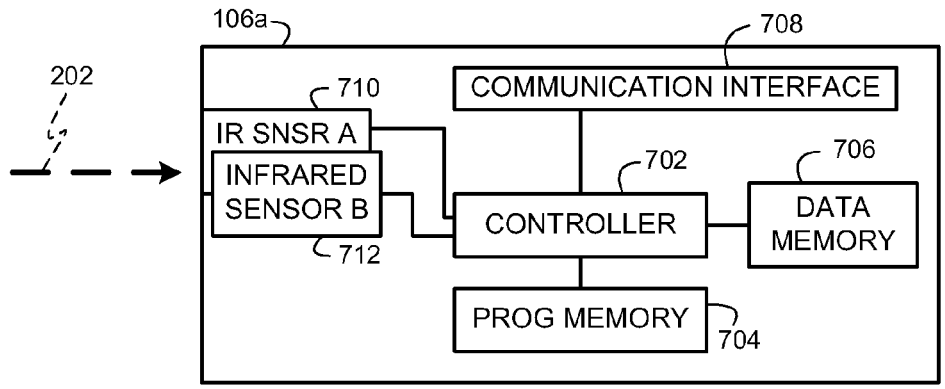
FIG. 7 is a block diagram of an example stationary receiver module of FIGS. 1-3.

FIG. 7 is a block diagram of the example stationary receiver module 106a of FIGS. 1-3. The stationary receiver module 106a includes a controller 702 communicatively coupled to a program memory 704 and a data memory 706. The program memory 704 stores machine readable and executable instructions, that when executed by the controller 702 cause the controller 702 to control operations of the stationary receiver module 106a to detect interruptions in the reception of the person detection signal 202, update person count values, and determine directions of travel of detected persons. The data memory 706 is configured to store the person count values and the direction of travel values in addition to other information discussed below in connection with FIG. 10.

To enable the stationary receiver module 106a to communicate the information stored in the data memory 706 to the in-store server 116 (FIGS. 1 and 3), the stationary receiver module 106a is provided with a communication interface 708. The communication interface 708 enables the controller 702 to communicate with the battery/communication module 302 of FIG. 3 so that the battery/communication module 302 can communicate the information to the in-store server 116 directly or indirectly via one or more of the repeaters 114. The communication interface 708 may be implemented using an industry standard interface (e.g., an RS-232 serial interface, an I²C BUS® interface, a serial peripheral interface (SPI) bus interface, a universal serial bus (USB) interface, etc.) or a proprietary communication interface.

To enable detection of the person detection signal 202, the stationary receiver module 106a is provided with an infrared sensor A 710 and an infrared sensor B 712. The sensors 710 and 712 are communicatively coupled to the controller 702 to alert the computer when each has detected an obstruction of the person detection signal 202 by no longer detecting reception of the signal 202. That is, while a person, cart, or basket is not moving between the stationary transmitter module 104a and the stationary receiver module 106a, the sensors 710 and 712 substantially continuously receive the person detection signal 202. When a person, cart, or basket moves between the transmitter 104a and the receiver 106a as shown in FIG. 2, the person detection signal 202 is obstructed and reception of the signal 202 is interrupted at the sensors 710 and 712. In the illustrated example, the sequence in which the sensors 710 and 712 detect an obstruction of the person detection signal 202 is indicative of a direction of travel of the person as discussed below in connection with FIG. 8.

Figure 8:
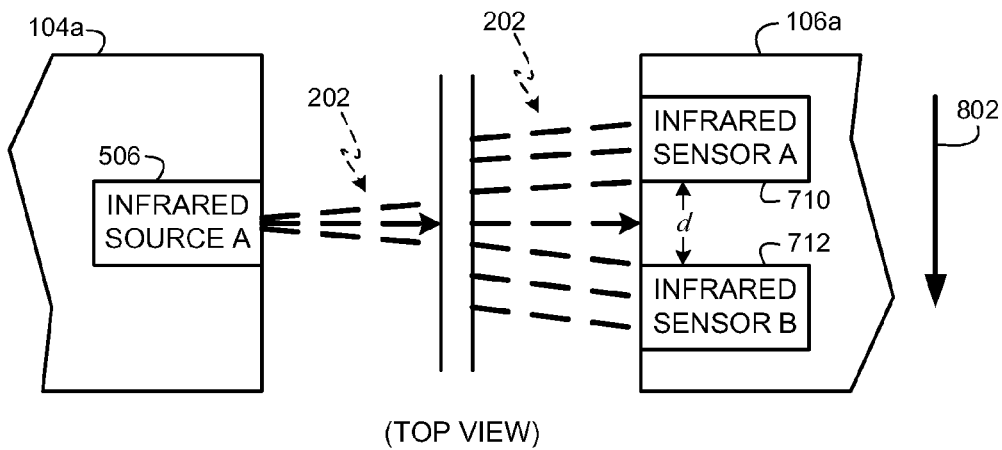
FIG. 8 is a top view of the example stationary transmitter and receiver modules of FIGS. 1-3, 5, and 7.

Turning to FIG. 8, a top view of the stationary transmitter module 104a and stationary receiver module 106a show the infrared source A 506 transmitting the person detection signal 202 toward the stationary receiver module 106a to enable detection of persons and determining directions of travel of those persons. In particular, to determine a direction of travel of a person when the person (or a cart or basket moved by the person) moves between the stationary transmitter module 104a and the stationary receiver module 106a, the stationary transmitter module 104a is configured to emit the person detection signal 202 in a fanned configuration. This fanning may be accomplished using a concave optical lens in connection with the infrared source A 506. The concave lens diverges the person detection signal into the fanning configuration so that an infrared footprint emitted onto the stationary receiver module 106a is wide enough to project onto both of the infrared sensors 710 and 712. As shown in FIG. 8, the infrared sensors 710 and 712 are horizontally spaced apart from one another by a distance (d) sufficient to cause a delay in time between when a passing person causes an obstruction of the reception of the signal 202 at the infrared sensor A 710 and an obstruction of the reception of the signal 202 at the infrared sensor B 712. In this manner, timestamps generated by the controller 702 and indicative of the times at which each of the infrared sensors 710 and 712 detected an obstruction event (i.e., no longer detecting reception of the signal 202) can be used to determine a direction of travel of a person. For example, if a first timestamp associated with an obstruction event at the infrared sensor A 710 is less than a second timestamp associated with an obstruction event at the infrared sensor B 712, the controller 702 can determine that a person traveled in a direction generally indicated by arrow 802, which could be a direction associated with entering or exiting a corresponding area (e.g., the zone (2) 102b of FIG. 1).

Figure 9:
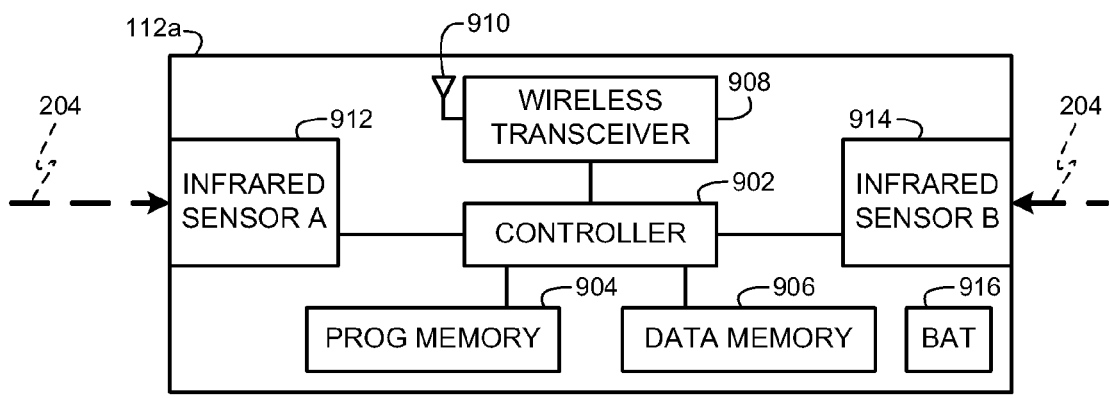
FIG. 9 is a block diagram of an example mobile tag of FIGS. 1-4.

FIG. 9 is a block diagram of the example mobile tag 112a of FIGS. 1-4. The block diagram of FIG. 9 may also be used to implement the example mobile tag 112b of FIG. 1. In the illustrated example, the example mobile tag 112a is provided with a controller 902 communicatively coupled to a program memory 904 and a data memory 906. The program memory 904 stores machine executable instructions, that when executed by the controller 902 cause the controller 902 to control operations of the mobile tag 112a to detect and receive the location identification signal 204 from the stationary transmitter module 104a and respective location identification signals of other ones of the stationary transmitter modules 104b-i (located throughout the retail establishment 100 as shown in FIG. 1) when the mobile tag 112a is moved near the stationary transmitter modules 104a-i. The controller 902 can collect the location identification code 603 (FIG. 6) from the received location identification signals 204 and store the code 603 in the data memory 906 in addition to other information discussed below in connection with FIG. 11.

In the illustrated example, the mobile tag 112a is provided with a wireless communication transceiver 908 to enable the controller 902 to wirelessly communicate the information stored in the data memory 906 to the in-store server 116 (FIGS. 1 and 3) directly or via one of the wireless communication repeaters 114 (FIGS. 1 and 3). In some instances, the mobile tag 112a may be moved outside of a wireless communication range with the in-store server 116 and/or the wireless communication repeaters 114 (e.g., the mobile tag 112a may be moved by a shopper to a parking lot area) and will not be able to communicate information from the data memory 906 to the in-store server 116. Thus, the controller 902 is configured to transmit an acknowledgement request via the wireless transceiver 908 and to wait for receipt of an acknowledgement from the in-store server 116 prior to initiating a data transfer operation of the information in the data memory 906. In this manner, the controller 902 will not transmit information to the server 116 until it can confirm that it is within a wireless communication range of the in-store server 116 and/or at least one of the wireless communication repeaters 114 (FIG. 1).

In the illustrated example, the mobile tag 112a can be implemented using an internal antenna 910. In this manner, a housing of the mobile tag 112a can protect the internal antenna 910 from damage. In the illustrated example, the wireless transceiver 908, the battery/communication module 302 (FIG. 3), the wireless communication repeaters 114 (FIG. 1), and a wireless communication interface of the in-store server 116 are implemented using radio frequency based ZIGBEE® wireless communication interfaces defined by the ZIGBEE® Alliance. However, in other example implementations, other wireless communication interfaces may be used instead including, for example, IEEE 802.11 wireless interfaces, Bluetooth® wireless interfaces, etc.

To detect the location identification code 603 (FIG. 6) of the location identification signal 204 from the stationary transmitter module 104a and respective location identification signals of other ones of the stationary transmitter modules 104b-i (located throughout the retail establishment 100 as shown in FIG. 1), the mobile tag 112a is provided with infrared sensors 912 and 914. To ensure that the mobile tag 112a will detect location identification signals from either of its sides, the infrared sensors 912 and 914 are mounted on opposing sides of the mobile tag 112a. In other example implementations, the mobile tag 112a may be provided with more infrared sensors 912 to detect infrared signals from more directions. For example, the mobile tag 112a may alternatively be provided with four infrared sensors 914. In such example implementations, the infrared sensors 912 and 914 can be located on opposing sides of the mobile tag 112a as shown in FIG. 9 and third and fourth infrared sensors (not shown) can be located on opposing front and back sides of the mobile tag 112a so that the mobile tag 112a can detect location identification signals from any direction without requiring that the cart 108 (or basket 110 for the mobile tag 112b of FIG. 1) be positioned in any particular direction.

In the illustrated example, the mobile tag 112a is provided with a battery 916 to power the controller 902, the memories 904 and 906, the wireless transceiver 908, and the sensors 912 and 914. The battery 916 may be rechargeable and/or replaceable. In operation, to conserve power in the battery 916, the controller 902 can be configured to remain in a low-power mode (e.g., a sleep mode, a standby mode, etc.) until either of the infrared sensors 912 or 914 detects an infrared signal. For example, when the infrared sensor 912 detects an infrared signal, it alerts the controller 902 to cause the controller 902 to wake up (e.g., via an interrupt). The controller 902 then determines whether the detected infrared signal included the start code 602 (FIG. 6) and, if so, the controller 902 reads the health information 604 and the location identification code 603 (FIG. 6) and stores the health information 604 and the identification code 603 in the data memory 906 in association with a timestamp indicative of the time of receipt of the infrared signal. Otherwise, if the controller 902 determines that the detected infrared signal did not include the start code 602, the controller 902 ignores the detected signal and returns to the low-power consumption mode to conserve battery power or life.

Figure 10:
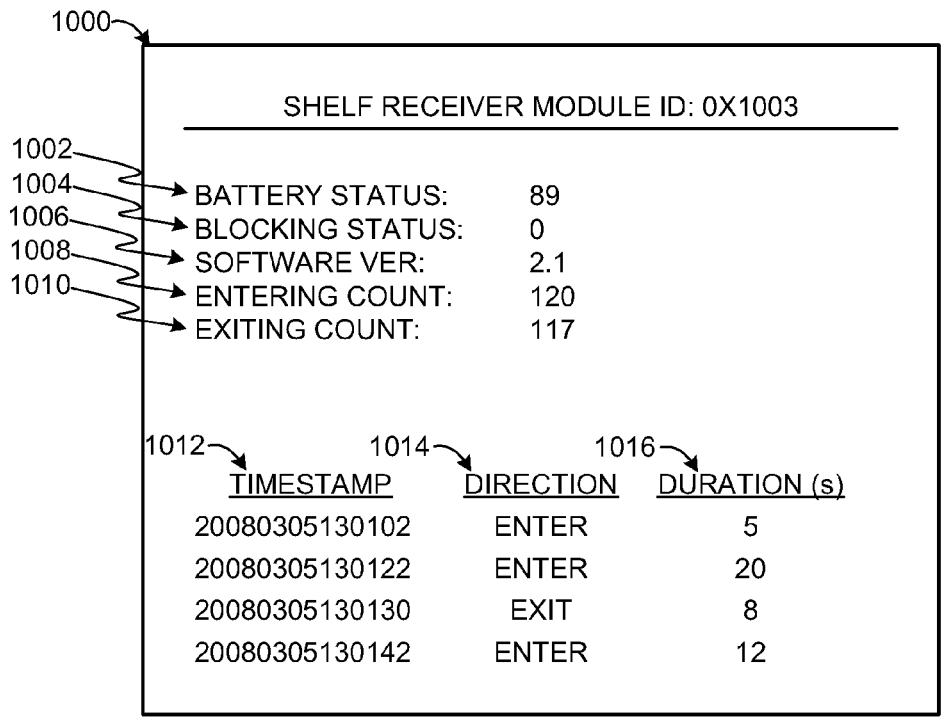
FIG. 10 is an example data structure used to store information in the example stationary receiver module of FIGS. 1-3, 7, and 8.

FIG. 10 is an example data structure 1000 used to store information in the data memory 706 (FIG. 7) of the stationary receiver module 106a of FIGS. 1-3, 7, and 8. In the illustrated example, the data structure 1000 stores battery status information 1002, blocking status information 1004, software version information 1006, an entering count value 1008, and an exiting count value 1010. The battery status information 1002 is indicative of the amount of power remaining in a battery of the battery/communication module 302 (FIG. 3). The blocking status information 1004 indicates whether reception of the person detection signal 202 (FIGS. 2, 3, 5, 7, and 8) has not been detected by the stationary receiver module 106a for an excessively long duration (e.g., based on a duration threshold value). The stationary receiver module 106a may fail to detect the person detection signal 202 for different reasons including, for example, blockage of the infrared source A 506 (FIGS. 5 and 8) and/or one or both of the infrared sensors 710 and 712 (FIGS. 7 and 8) by a person, a product, garbage, dust accumulation, etc. Additionally or alternatively, failure to receive the person detection signal 202 may be due to a malfunction of the infrared source A 506 and/or one or both of the infrared sensors 710 and 712. In the illustrated example, the blocking status information 1002 is used to notify a person (e.g., a store employee) of the blocked status so that the person can clear any blocking object and/or repair the infrared source A 506 and/or one or both of the infrared sensors 710 and 712. For example, the stationary receiver module 106a can communicate the block status information 1004 to the in-store server 116, and the in-store server 116 can present a notification or a message of the block status to alert someone to investigation and correction purposes. The software version information 1006 indicates the version of software and/or firmware stored in program memory 704 (FIG. 7). In this manner, a person can verify which software/firmware version the stationary receiver module 106a is using.

The entering count value 1008 indicates the number of people (e.g., shoppers) that have entered an area (e.g., the zone (2) 102b of FIG. 1) corresponding to the stationary receiver module 106a. The exiting count value 1010 indicates the number of people (e.g., shoppers) that have exited an area (e.g., the zone (2) 102b of FIG. 1) corresponding to the stationary receiver module 106a. Whether the controller 702 (FIG. 7) of the stationary receiver module 106a counts a person as having entered or exited the zone (2) 102b (FIG. 1) is based on the direction of travel detected based on the sequence of signal obstructions at the infrared sensors 710 and 712 (FIGS. 7 and 8).

As shown in FIG. 10, the data structure 1000 also stores timestamp entries 1012, direction of travel entries 1014, and duration entries 1016. In the illustrated example, each of the timestamp entries 1012 is represented in the format YYYYM-MDDhhmmss, where YYYY=year, MM=month, DD=day, hh=24 hour, mm=minutes, and ss=seconds.

Each of the direction entries 1014, indicates the direction of travel (entering or exiting an area) for each person detected as passing between the stationary transmitter module 104*a* and the stationary receiver module 106*a*. The duration entries 1016 indicate the durations lapsed between the detection of persons corresponding to corresponding ones of the timestamp entries 1012 and direction entries 1014. In operation, when the stationary receiver module 106*a* detects a person, the controller 702 determines the direction of travel of the person and stores the direction of travel as one of the direction entries 1014 in association with a corresponding one of the timestamps indicative of when the person was detected. In addition, the controller 702 determines a corresponding duration entry value 1016 by subtracting the timestamp from an immediately previously generated timestamp of an immediately previous direction entry 1014.

In the illustrated example, the stationary receiver module 106*a* is configured to transmit the battery status information 1002, the blocking status information 1004, the software version information 1006, the count values 1008, 1010, the timestamp entries 1012, the direction entries 1014, and the duration entries 1016 to the in-store server 116 when the data memory 706 is full, at predetermined time intervals, and/or upon determining that reception of the person detection signal 202 is no longer detected at the sensors 710 and 712 (and, thus, the block status 1004 is set). By communicating the blocking status information 1004 to the in-store server 116 when it indicates that an obstruction is present (or that the person detection signal 202 is otherwise not detected), the server 116 can notify a person to remove the obstruction and/or fix the infrared source A 506 and/or one or both of the infrared sensors 710 and 712.

Figure 11:
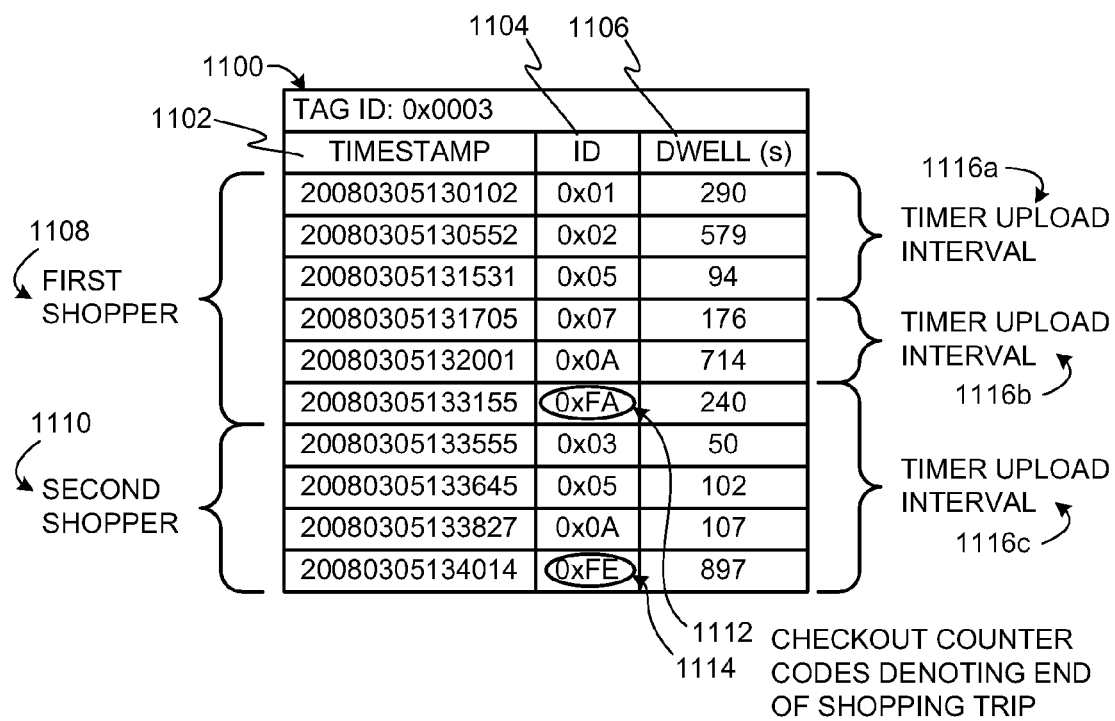
FIG. 11 is another example data structure used to store path of travel information in the example mobile tag of FIGS. 1-4 and 9.

FIG. 11 is another data structure 1100 used to store path of travel information (e.g., a path of travel log) in the data memory 906 of the example mobile tag 112*a* of FIGS. 1-4 and 9 (and/or in a memory of the in-store server 116 of FIGS. 1 and 3). In the illustrated example, the data structure 1100 stores timestamp entries 1102, location identification codes 1104, and dwell time values 1106. Each of the timestamp entries 1102 indicates the time at which the mobile tag 112*a* entered an area (e.g., one of the zones 102*a-h* of FIG. 1) indicated by a corresponding one of the location identification codes 1104. In addition, a corresponding one of the dwell time values 1106 indicates the duration for which the mobile tag 112*a* was located in the area. To determine a dwell time (e.g., one of the dwell time values 1106), the controller 902 (FIG. 9) can measure the amount of time that lapses between an initial detection of a location identification code (e.g., the location identification code 603 of FIG. 6) indicating an entry into a particular area (e.g., the zone (2) 102*b* of FIG. 1) and a subsequent detection of the same location identification code indicating an exit from the particular area. For instance, in the zone (2) 102*b* of FIG. 1, the stationary transmitter modules 104*a* and 104*f* transmit the same location identification code indicative of the zone (2) 102*b*. Thus, to measure the dwell time or duration of a person in the zone (2) 102*b*, the controller 902 can generate a first timestamp indicative of the detection of a location identification code transmitted by the stationary transmitter module 104*a* as the person enters the zone (2) 102*b* and generate a second timestamp indicative of the detection of the same location identification code transmitted by the stationary transmitter module 104*f* as the person exits the zone (2) 102*b*. The controller 902 can then determine the dwell time by subtracting the first timestamp from the second timestamp. During an analysis phase, the in-store server 116 and/or the server 118 at the central facility 120 (FIG. 1) can use the entries 1102, 1104, and 1106 to determine paths of travel of different shoppers that walked through the retail establishment 100.

In the illustrated example, the entries 1102, 1104, and 1106 are representative of two different shopping trips 1108 and 1110 that ended by passing through the checkout counters 111 (FIG. 1). The ends of the shopping trips are denoted by respective checkout counter identification codes 1112 and 1114. During an analysis phase, the in-store server 116 and/or the server 118 at the central facility 120 (FIG. 1) can use the checkout counter identification codes 1112 and 1114 to separate paths of travel corresponding to shopping trips of different shoppers.

Also shown in the illustrated example of FIG. 11 are timer-based upload interval indicators 1116*a-c*, each of which indicates the number of entries 1102, 1104, and 1106 that were wirelessly communicated by the mobile tag 112*a* to the in-store server 116 based on fifteen-minute intervals. In other example implementations, the upload intervals can be configured to be any duration (e.g., 30 minutes, 45 minutes, 60 minutes, etc.) stored in the program memory 904 of the tag 112*a*. In the illustrated example, the timer-based upload intervals 1116*a* and 1116*b* occur before the first shopping trip 1108 ends, and the checkout counter identification codes 1112 and 1114 for both of the shopping trips 1108 and 1110 are communicated in the timer-based upload interval 1116*c*. However, the in-store server 116 stores all of the received entries 1102, 1104, and 1106 in chronological order based on the timestamp entries 1102 for the mobile tag 112*a* and its tag identifier 0x0003. In this manner, during an analysis phase, each shopping trip recorded by each mobile tag can be identified based on checkout counter identification codes (e.g., the checkout counter identification codes 1112 and 1114).

In some instances, shoppers may walk through the retail establishment 100 with a cart or a basket having one of the mobile tags 112*a-b* and ending their shopping trip without going through one of the check out counters 111 (FIG. 1). To detect such instances, each of the mobile tags 112*a-b* is configured to determine when they have not received a location identification code (e.g., the location identification code 603 of FIG. 6) for a predetermined threshold duration. When such an event occurs, the mobile tag 112*a* can generate and store a trip end identification code as one of the identification codes 1104 and a corresponding timestamp entry to force a demarcation indicating the end of a shopping trip.

Figure 12A:
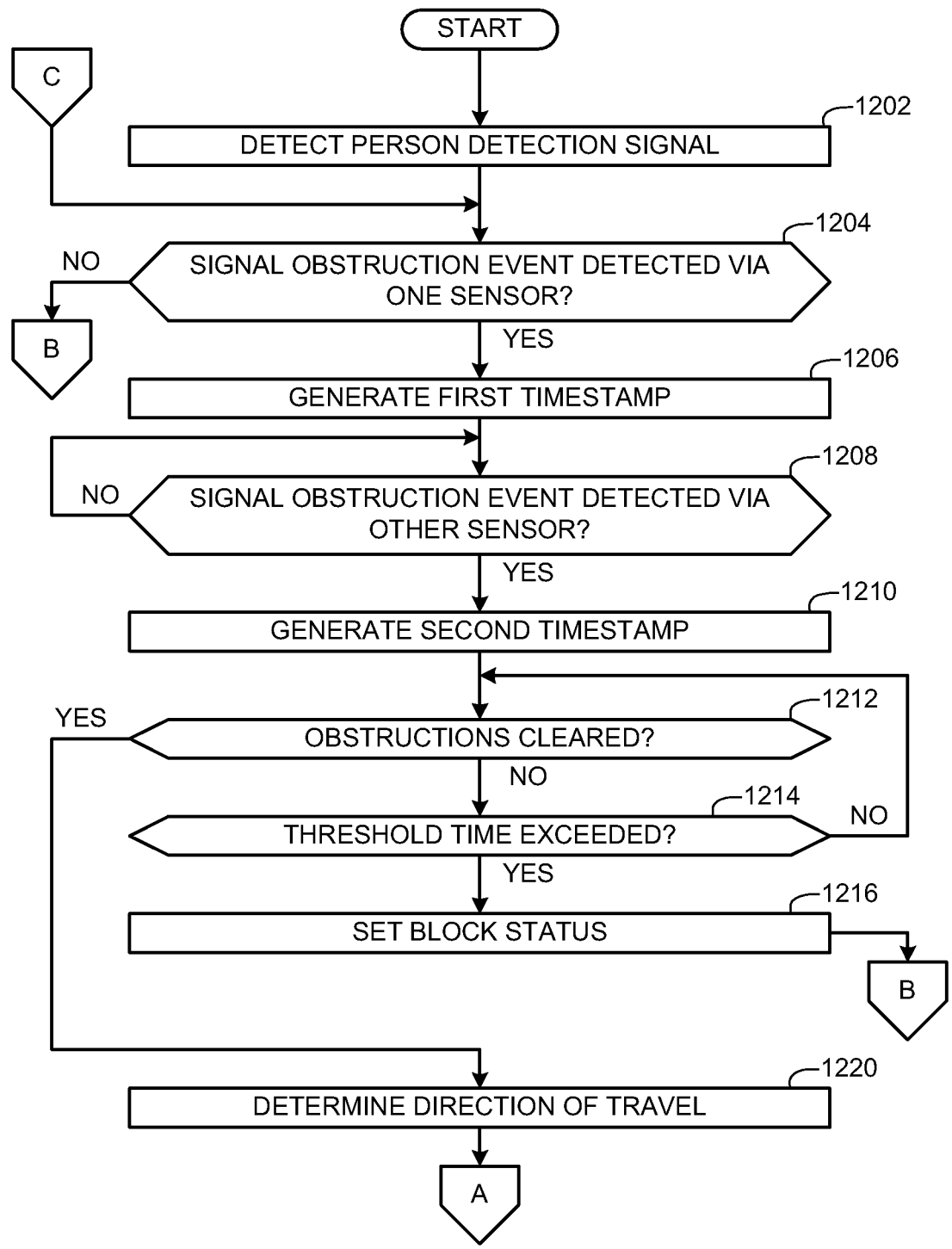
FIGS. 12A and 12B depict a flow diagram representative of machine executable instructions that can be executed to implement the example stationary receiver module of FIGS. 1-3, 7, and 8.
Figure 12B:
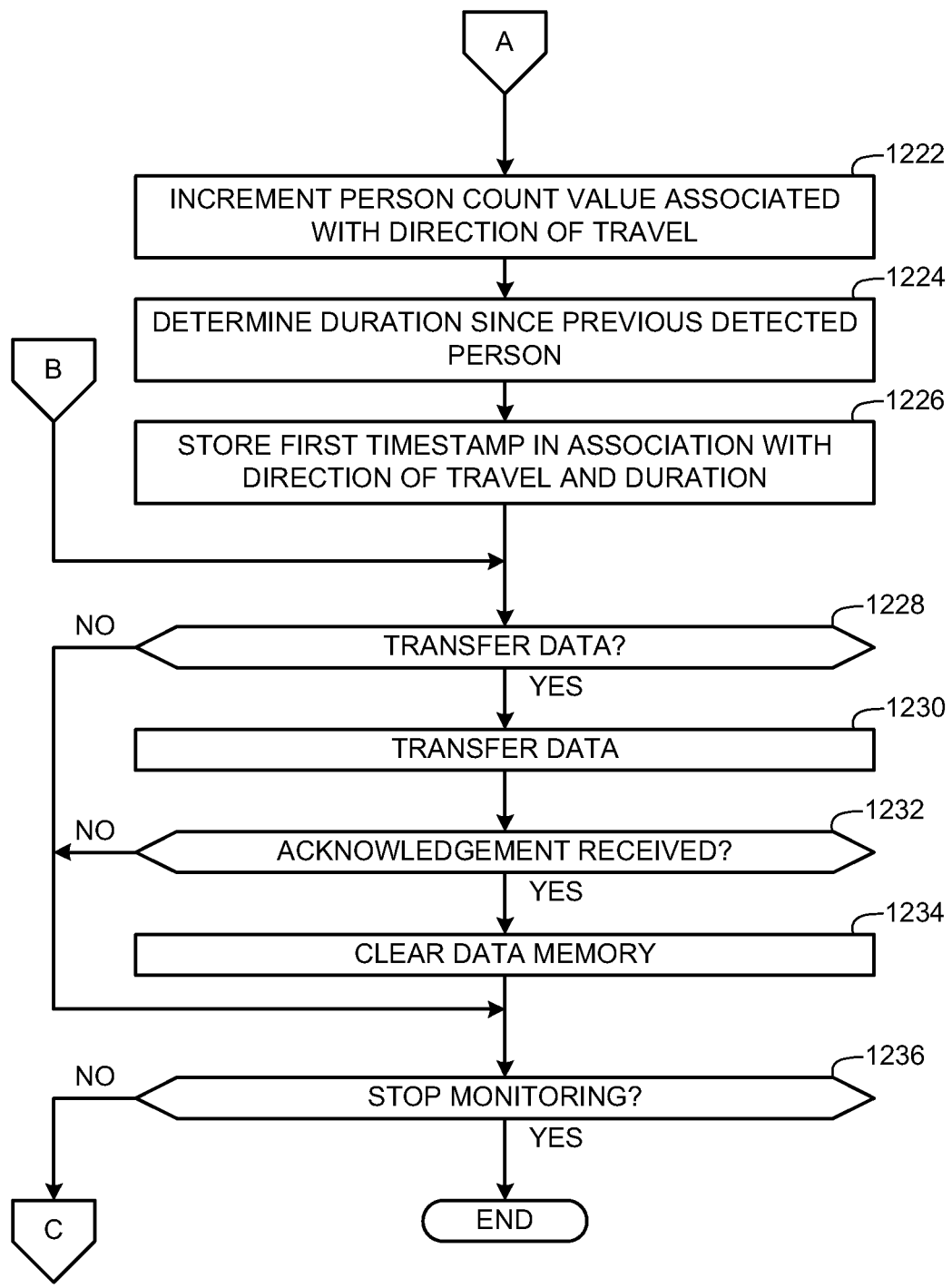
Figure 13:
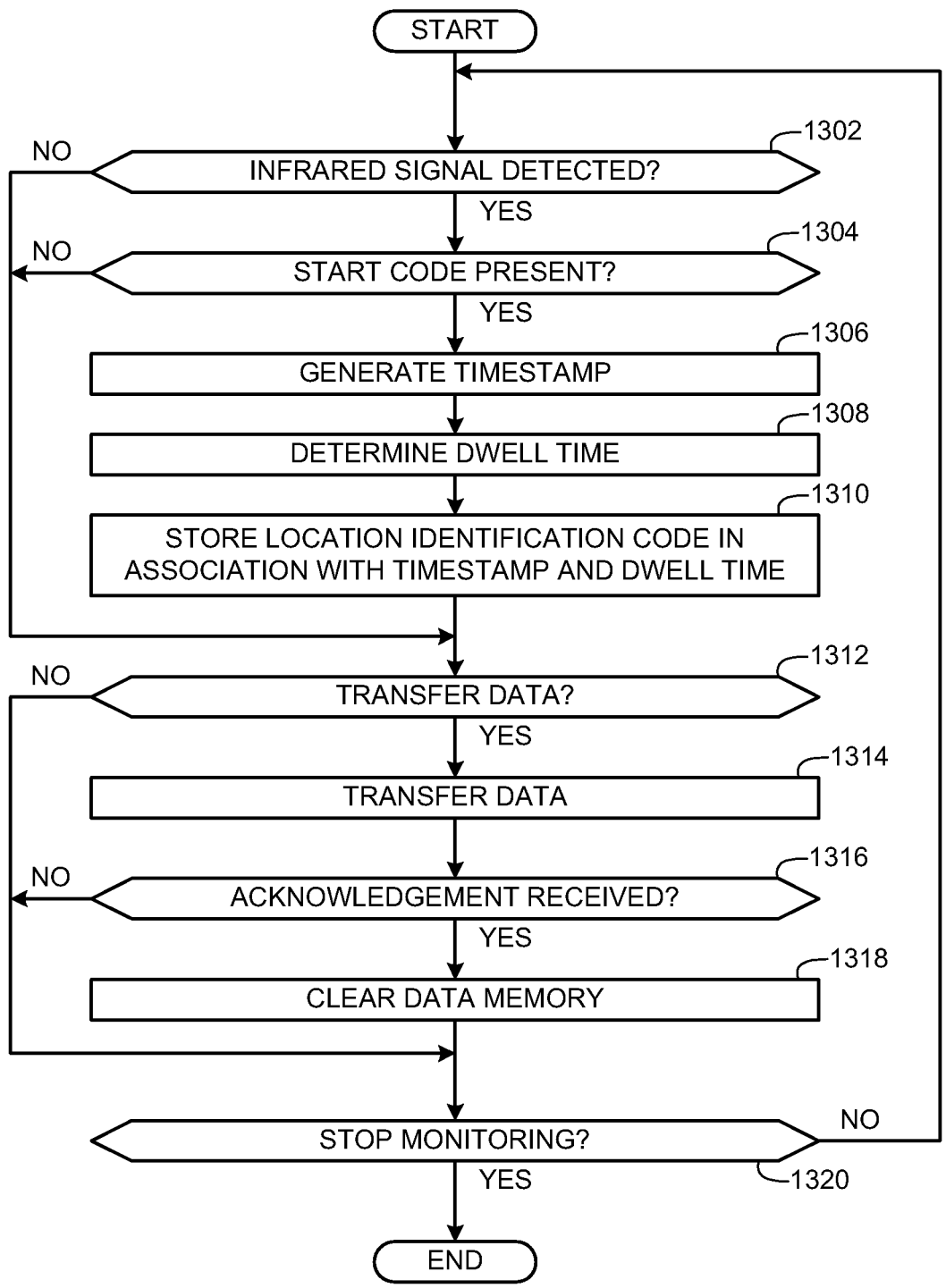
FIG. 13 is a flow diagram representative of machine executable instructions that can be executed to implement the example mobile tag of FIGS. 1-4 and 9.

Flow diagrams depicted in FIGS. 12A, 12B and 13 are representative of machine readable and executable instructions or processes that can be executed to implement the example stationary receiver module 106*a* of FIGS. 1-3, and 7 and the example mobile tag 112*a* of FIGS. 1-4 and 9. The example processes of FIGS. 12A, 12B, and 13 may be performed using a processor, a controller and/or any other suitable processing device. For example, the example processes of FIGS. 12A, 12B, and 13 may be implemented in coded instructions stored on a tangible medium such as a flash memory, a read-only memory (ROM) and/or random-access memory (RAM) associated with a processor (e.g., the controller 702 and 902 of FIGS. 7 and 9). Alternatively, some or all of the example processes of FIGS. 12A, 12B, and 13 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 12A, 12B, and 13 may be implemented manually or as any combination(s) of any of the foregoing techniques, for example, any combination of firmware, software, discrete logic and/or hardware. Further, although the example processes of FIGS. 12A, 12B, and 13 are described with reference to the flow diagrams of FIGS. 12A, 12B, and 13, other methods of implementing the processes of FIGS. 12A, 12B, and 13 may be employed. For example, the order of execution of the blocks may be changed, and/or some of the blocks described may be changed, eliminated, sub-divided, or combined. Additionally, any or all of the example processes of FIGS. 12A, 12B, and 13 may be performed sequentially and/or in parallel by, for example, separate processing threads, processors, devices, discrete logic, circuits, etc.

Turning to FIGS. 12A and 12B, the depicted flow diagram is representative of an example process that may be performed to implement the example stationary receiver device 106a of FIGS. of FIGS. 1-3, and 7. In the illustrated example, the example process of FIGS. 12A and 12B detects people that move between the stationary transmitter module 104a and the stationary receiver module 106a and their directions of travel. The example process stores the directions of travel (e.g., the direction of travel entries 1014 of FIG. 10) and person count values (e.g., the count values 1008 and 1010 of FIG. 10). Although the example process of FIGS. 12A and 12B is described in connection with the stationary receiver module 106a, the example process can also be used to implement the other stationary receiver modules 106b-f of FIG. 1.

Initially, the controller 702 (FIG. 7) detects the person detection signal 202 (FIGS. 2 3, 5, 7, and 8) (block 1202) via the infrared sensors 710 and 712 (FIGS. 7 and 8). The controller 702 then determines whether an obstruction event of the person detection signal 202 has occurred at one of the infrared sensors 710 and 712 (block 1204). For example, the controller 702 may periodically poll one or more bits or ports connected to the infrared sensors 710 and 712 to determine if either has stopped receiving the person detection signal 202. Alternatively, the controller 702 may be notified by an interrupt that one of the infrared sensors 710 and 712 has stopped receiving the person detection signal 202. For example, the stationary transmitter module 104a may be configured to transmit the person detection signal 202 multiple times per second at predetermined intervals, and an interrupt routine may be programmed in the controller 702 of the stationary receiver module 106a to detect when the infrared sensors 710 and 712 have not received the person detection signal 202 within a predetermined amount of time (e.g., 200 milliseconds). In this manner, an interrupt can notify the controller 702 when one of the sensors 710 or 712 has not received the person detection signal 202 within the predetermined amount of time.

When an obstruction of the person detection signal 202 has occurred at one of the infrared sensors 710 and 712 (block 1204), the controller 702 responds to the obstruction event by generating a first timestamp (block 1206) indicative of the time at which the obstruction occurred. The controller 702 determines whether an obstruction event of the person detection signal 202 has been detected at the other one of the infrared sensors 710 and 712 (block 1208). When the obstruction at the other one of the infrared sensors 710 and 712 is detected (block 1208), the controller 702 responds to the obstruction event by generating a second timestamp (block 1210) indicative of the time at which the second obstruction occurred.

The controller 702 determines whether the obstructions from the infrared sensors 710 and 712 have been cleared (block 1212). If the obstructions have not been cleared (block 1212), the controller 702 determines whether a time threshold has been exceeded (block 1214) based on, for example, the first or second timestamp. If the time threshold has not been exceeded, control returns to block 1212. Otherwise, if the time threshold has been exceeded, the controller sets a block status flag (block 1216) by, for example, storing a value in the block status information 1004 of FIG. 10 indicative of the presence of an obstruction between the stationary transmitter module 104a and the stationary receiver module 106a. Although the failure to receive the person detection signal 202 at the stationary receiver module 106a is described as being due to an obstruction, in some instances the failure to receive the person detection signal 202 may instead be due to a malfunction of the infrared source A 506 (FIGS. 5 and 8) and/or one or both of the infrared sensors 710 and 712 (FIGS. 7 and 8).

If at block 1212 the controller 702 detects that the obstructions detected at blocks 1204 and 1208 have been cleared from the infrared sensors 710 and 712, control continues to block 1220, at which point the controller 702 determines the direction of travel of the detected person (or shopping cart or shopping basket) (block 1220). For example, the controller 702 can determine the direction of travel based on the first and second timestamps generated at blocks 1206 and 1210 as discussed above in connection with FIG. 8.

The controller 702 then increments one of the count values 1008 and 1010 of FIG. 10 (block 1222) (FIG. 12B). Specifically, the controller 702 increments whichever one of the count values 1008 or 1010 corresponds to whether the direction of travel indicated that a person entered or exited from a corresponding area. The controller 702 determines the duration (e.g., one of the duration entries 1016 of FIG. 10) since a previously detected person (block 1224). The controller 702 then stores the first timestamp (generated at block 1206 of FIG. 12A) in association with the direction of travel and the duration in the data memory 706 of FIG. 7 (block 1226). For example, the controller 702 can store this information in the data structure 1000 described above in connection with FIG. 10.

After the controller 702 stores the information at block 1226 or if the controller 702 determines that it has not detected an obstruction at block 1204 or after the controller sets the block status information 1004 at block 1216, the controller 702 determines whether it should transfer data stored in the data memory 706 to the in-store server 116 (block 1228). For example, data transfers may be scheduled based on particular times of day or predetermined time intervals. Additionally or alternatively, the controller 702 can perform a data transfer when the amount of data in the data memory 706 is approaching a maximum capacity. In the illustrated example, the controller 702 is configured to transfer the data in the data memory 706 any time the block status information 1004 was set at block 1216 to indicate that an obstruction is interfering with the operation of the stationary receiver module 106a.

If the controller 702 determines that it should transfer the data (block 1228), the controller 702 transmits the data (e.g., the data described above in connection with the data structure 1000 of FIG. 10) to the in-store server 116 (block 1230). In the illustrated example, the in-store server 116 is configured to store data received from each of the stationary receiver modules 106a-f in association with the receiver identifier (e.g., the shelf receiver module identifier 0x1003 of FIG. 10) of that stationary receiver module so that data from different stationary receiver modules can be maintained separately and analyzed separately.

When the controller 702 receives an acknowledgement from the in-store server 116 indicating that it has successfully received all the data (block 1232), the controller 702 deletes the data from the data memory 706 (block 1234). However, if the controller 702 does not receive an acknowledgement from the in-store server 116, it does not delete the data from the data memory 706. In any case, the controller 702 determines whether it should stop monitoring (block 1236). For example, the controller 702 may stop monitoring if the stationary receiver module 106*a* has been turned off, if a battery level is too low, if an obstruction of or otherwise failure to receive the person detection signal 202 has been detected, or if the data memory 706 is filled to a maximum capacity and cannot store more information. If the controller 702 determines that it should not stop monitoring (block 1236), control returns to block 1202 of FIG. 12A. Otherwise, the example process of FIGS. 12A and 12B is ended.

Turning now to FIG. 13, the depicted flow diagram is representative of an example process that may be performed to implement the example mobile tag 112*a* of FIGS. 1-4 and 9. Initially, the controller 902 (FIG. 9) determines whether it has received an infrared signal (block 1302). For example, the controller 902 may periodically poll one or more bits or ports connected to the infrared sensors 912 and 914 to determine if either has detected an infrared signal. Alternatively, the controller 902 may be notified by an interrupt that one of the infrared sensors 912 and 914 has received an infrared signal. Using an interrupt-driven technique based on a detected infrared signal or a timer enables configuring the controller 902 to remain in a low-power mode until an infrared signal is detected. When an infrared signal has been detected by one of the infrared sensors 912 and 914 (block 1302), the controller 902 determines whether the start code 602 (FIG. 6) is present in the received signal (block 1304). In the illustrated example, the presence of the start code 602 indicates that the detected infrared signal is a location identification infrared signal (e.g., the location identification signal 204) from one of the stationary transmitter modules 104*a-i* of FIG. 1.

If the controller 902 determines that the start code 602 is present (block 1304), the controller 902 generates a timestamp (block 1306) such as, for example, one of the timestamps of the timestamp entries 1102 of FIG. 11. The timestamp is indicative of the time at which the mobile tag 112*a* detected the infrared signal. The controller 902 then determines a dwell time (block 1308) such as, for example, one of the dwell time entries of 1106 as discussed above in connection with FIG. 11. The controller 902 then stores the location identification code in association with the timestamp and the dwell time in the data memory 906 (block 1310). For example, the controller 902 can store this information in the data structure 1100 described above in connection with FIG. 11.

After the controller 902 stores the information at block 1310 or if the controller 902 determines that the start code 602 is not present in a detected infrared signal at block 1304 or if an infrared signal is not detected at block 1302, the controller 902 determines whether it should transfer data stored in the data memory 906 to the in-store server 116 (block 1312). For example, data transfers may be scheduled based on particular times of day or predetermined time intervals. Additionally or alternatively, the controller 902 can perform a data transfer when the amount of data in the data memory 906 is approaching a maximum capacity.

If the controller 902 determines that it should transfer the data (block 1312), the controller 902 transmits the data (e.g., the data described above in connection with the data structure 1100 of FIG. 11) to the in-store server 116 (block 1314). In the illustrated example, the in-store server 116 is configured to store data received from each mobile tag in association with the tag identifier (e.g., the tag identifier 0x0003 of FIG. 11) of that mobile tag so that data from different mobile tags can be maintained separately and analyzed separately.

When the controller 902 receives an acknowledgement from the in-store server 116 indicating that it has successfully received all the data (block 1316), the controller 902 deletes the data from the data memory 906 (block 1318). However, if the controller 902 does not receive an acknowledgement from the in-store server 116, it does not delete the data from the data memory 906. In this manner, the controller 902 can subsequently attempt to communicate the data to the in-store server 116 again. In any case, the controller 902 determines whether it should stop monitoring (block 1320). For example, the controller 902 may stop monitoring if the mobile tag 112*a* has been turned off, if a battery level is too low, or if the data memory 906 is filled to a maximum capacity and cannot store more information. If the controller 902 determines that it should not stop monitoring (block 1320), control returns to block 1302 of FIG. 13. Otherwise, the example process of FIG. 13 is ended.

Although the above description refers to the flowcharts as being representative of methods, those methods may be implemented entirely or in part by executing machine readable instructions. Therefore, the flowcharts are representative of methods and machine readable instructions.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method, comprising:
   determining a direction of travel of a third device associated with a shopper based on a first signal transmitted via a first device in a first direction to a second device; and
   determining a path of travel of the third device through a monitored establishment based on a second signal transmitted via the first device in a second direction to the third device.

2. The method as defined in claim 1, wherein the first signal is an infrared signal and further including transmitting information associated with the first signal from the second device to a server via a radio frequency signal.

3. The method as defined in claim 1, further including storing first direction information at the second device indicative of the direction of travel in association with a first timestamp indicative of a first time at which an event associated with the direction of travel was detected at the second device.

4. The method as defined in claim 3, further including transmitting the first direction information and the first timestamp and a plurality of other direction information and respective timestamps to a server.

5. The method as defined in claim 3, wherein the event includes detecting a first interruption in the reception of the first signal at the first time via a first sensor of the second device and detecting a second interruption in the reception of the first signal at a second time via a second sensor of the second device.

6. The method as defined in claim 5, wherein the determining the direction of travel of the third device inlcudes determining the direction of travel of the third device based on the first timestamp indicative of the first time and a second timestamp indicative of the second time.

7. The method as defined in claim 1, further including communicating information to a server from the second device indicative of an error associated with at least one of transmission of the first signal or reception of the first signal.

8. The method as defined in claim 7, further including presenting a notification via the server based on the information indicative of the error.

9. The method as defined in claim 1, wherein the second signal includes an identifier of a location in the monitored establishment proximate the first device.

10. The method as defined in claim 1, wherein the monitored establishment is one of a retail establishment or a commercial establishment.

11. The method as defined in claim 1, further including storing a duration value indicative of a duration between the occurrence of a first event associated with determining the direction of travel based on the first signal and a second event associated with determining a second direction of travel based on the first signal.

12. The method as defined in claim 11, wherein the first and second events include obstructing the first signal.

13. The method as defined in claim 1, further including storing at the second device a first count value indicative of a first quantity of persons detected as traveling in a first direction and a second count value indicative of a second quantity of persons detected as traveling in a second direction.

14. The method as defined in claim 1, further including determining via the third device whether the second signal includes a code matching a start code value.

15. A system, comprising:
a first device to transmit a first signal via a first source in a first direction and a second signal via a second source in a second direction;
a second device to receive the first signal and determine a direction of travel of a shopper based on detecting an interruption of the reception of the first signal at the second device; and
a third device to receive the second signal and store a location identification code received via the second signal in a path of travel log indicative of at least one path of travel through a monitored establishment.

16. The system as defined in claim 15, wherein the first signal is an infrared signal, and wherein the second device is further to transmit the direction of travel to a server via a radio frequency transmitter.

17. The system as defined in claim 15, wherein the second device is to store the direction of travel in association with a first timestamp entry, the first timestamp entry being indicative of a time at which the interruption in the reception of the first signal occurred.

18. The system as defined in claim 17, wherein the second device is further to transmit the direction of travel and the first timestamp entry and a plurality of other direction of travel information and respective timestamp entries to a server.

19. The system as defined in claim 15, wherein the second device detects the interruption in the reception of the first signal via a first sensor at a first time and detects a second interruption in the reception of the first signal via a second sensor at a second time.

20. The system as defined in claim 19, wherein the second device is to determine the direction of travel based on a first timestamp value indicative of the first time and a second timestamp value indicative of the second time.

21. The system as defined in claim 15, further including a server communicatively coupled to the second device, wherein the second device is further to communicate information to the server indicative of an error associated with at least one of transmission of the first signal or reception of the first signal.

22. The system as defined in claim 21, wherein the server is further to present a notification based on the information indicative of the error.

23. The system as defined in claim 15, wherein the location identification code is indicative of an area of a retail establishment.

24. The system as defined in claim 15, wherein the second device is further to store a duration value indicative of a duration between the occurrence of a first event associated with determining the direction of travel based on the first signal and a second event associated with determining a second direction of travel based on the first signal.

25. The system as defined in claim 15, wherein the second device is further to store a first count value indicative of a first quantity of shoppers detected as traveling in a first direction and a second count value indicative of a second quantity of shoppers detected as traveling in a second direction.

26. The system as defined in claim 15, wherein the third device is further to determine whether the second signal includes a code matching a start code value.

27. The system as defined in claim 15, wherein the third device is mounted to at least one of a shopping cart or a shopping basket.

* * * * *